United States Patent
Van Den Hoek et al.

(10) Patent No.: US 9,433,938 B2
(45) Date of Patent: Sep. 6, 2016

(54) WET CHEMICAL AND PLASMA METHODS OF FORMING STABLE PTPD CATALYSTS

(71) Applicant: SDCmaterials, Inc., Tempe, AZ (US)

(72) Inventors: Willibrordus G. M. Van Den Hoek, Saratoga, CA (US); Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

(21) Appl. No.: 14/946,689

(22) Filed: Nov. 19, 2015

(65) Prior Publication Data

US 2016/0144352 A1 May 26, 2016

Related U.S. Application Data

(63) Continuation of application No. 14/175,894, filed on Feb. 7, 2014, now Pat. No. 9,216,406, which is a continuation of application No. 13/033,514, filed on Feb. 23, 2011, now Pat. No. 8,669,202.

(51) Int. Cl.
*B01J 21/00* (2006.01)
*B01J 21/04* (2006.01)
(Continued)

(52) U.S. Cl.
CPC ............ *B01J 37/349* (2013.01); *B01J 23/44* (2013.01); *B01J 35/008* (2013.01); *B01J 35/0013* (2013.01); *B01J 35/023* (2013.01)

(58) Field of Classification Search
CPC ........ B01J 23/42; B01J 23/44; B01J 35/006; B01J 35/008; B01J 35/0073; B01J 37/349
USPC ........... 502/5, 262, 263, 327, 332–334, 339, 502/355, 415, 439; 977/773, 775, 896, 900
See application file for complete search history.

(56) References Cited

U.S. PATENT DOCUMENTS

| 1,477,664 | A | 12/1923 | Rankin |
| 2,021,936 | A | 11/1935 | Johnstone |

(Continued)

FOREIGN PATENT DOCUMENTS

| CN | 1647858 A | 8/2005 |
| CN | 101011664 A | 8/2007 |

(Continued)

OTHER PUBLICATIONS

Ahmad, K. et al. (2008). "Hybrid Nanocomposites: A New Route Towards Tougher Alumina Ceramics," *Composites Science and Technology* 68: 1321-1327.

(Continued)

*Primary Examiner* — Cam N Nguyen
(74) *Attorney, Agent, or Firm* — Morrison & Foerster LLP

(57) ABSTRACT

A nano-particle comprising: an interior region comprising a mixed-metal oxide; and an exterior surface comprising a pure metal. In some embodiments, the mixed-metal oxide comprises aluminum oxide and a metallic pinning agent, such as palladium, copper, molybdenum, or cobalt. In some embodiments, the pure metal at the exterior surface is the same as the metallic pinning agent in the mixed-metal oxide in the interior region. In some embodiments, a catalytic nano-particle is bonded to the pure metal at the exterior surface. In some embodiments, the interior region and the exterior surface are formed using a plasma gun. In some embodiments, the interior region and the exterior surface are formed using a wet chemistry process. In some embodiments, the catalytic nano-particle is bonded to the pure metal using a plasma gun. In some embodiments, the catalytic nano-particle is bonded to the pure metal using a wet chemistry process.

17 Claims, 8 Drawing Sheets

(51) Int. Cl.

| | | |
|---|---|---|
| *B01J 23/00* | (2006.01) | |
| *B01J 23/02* | (2006.01) | |
| *B01J 23/08* | (2006.01) | |
| *B01J 23/14* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 37/34* | (2006.01) | |
| *B01J 35/00* | (2006.01) | |
| *B01J 35/02* | (2006.01) | |

(56) References Cited

U.S. PATENT DOCUMENTS

| | | |
|---|---|---|
| 2,284,554 A | 5/1942 | Beyerstedt |
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,108,006 A | 10/1963 | Kenedi et al. |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,290,723 A | 12/1966 | Jaques et al. |
| 3,309,873 A | 3/1967 | Cann |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Miyajima |
| 3,520,656 A | 7/1970 | Yates et al. |
| 3,537,513 A | 11/1970 | Austin |
| 3,552,653 A | 1/1971 | Inoue |
| 3,589,351 A | 6/1971 | Shoupp et al. |
| 3,617,358 A | 11/1971 | Dittrich |
| 3,667,111 A | 6/1972 | Chartet |
| 3,676,638 A | 7/1972 | Stand |
| 3,730,827 A | 5/1973 | Matchen et al. |
| 3,741,001 A | 6/1973 | Fletcher et al. |
| 3,743,708 A | 7/1973 | Chase et al. |
| 3,752,172 A | 8/1973 | Cohen et al. |
| 3,761,360 A | 9/1973 | Auvil et al. |
| 3,774,442 A | 11/1973 | Gustavsson |
| 3,804,034 A | 4/1974 | Stiglich, Jr. |
| 3,817,711 A | 6/1974 | Kugler et al. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,006,340 A | 2/1977 | Gorinas |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,252,843 A | 2/1981 | Dorer et al. |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,335,080 A | 6/1982 | Davis et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,665,296 A | 5/1987 | Iwata et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,869,936 A | 9/1989 | Moskowitz et al. |
| 4,877,937 A | 10/1989 | Müller |
| 4,885,038 A | 12/1989 | Anderson et al. |
| 4,902,870 A | 2/1990 | Frind et al. |
| 4,916,107 A | 4/1990 | Brand et al. |
| 4,921,586 A | 5/1990 | Molter |
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,656 A | 7/1993 | Frind |
| 5,230,844 A | 7/1993 | Macaire et al. |
| 5,233,153 A | 8/1993 | Coats |
| 5,260,241 A | 11/1993 | Addiego et al. |
| 5,269,848 A | 12/1993 | Nakagawa |
| 5,276,693 A | 1/1994 | Long et al. |
| 5,280,757 A | 1/1994 | Carter et al. |
| 5,294,242 A | 3/1994 | Zurecki et al. |
| 5,330,945 A | 7/1994 | Beckmeyer et al. |
| 5,338,716 A | 8/1994 | Triplett et al. |
| 5,357,075 A | 10/1994 | Muehlberger |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,436,080 A | 7/1995 | Inoue et al. |
| 5,439,865 A | 8/1995 | Abe et al. |
| 5,442,153 A | 8/1995 | Marantz et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |

(56) References Cited

U.S. PATENT DOCUMENTS

| | | |
|---|---|---|
| 5,486,675 A | 1/1996 | Taylor et al. |
| 5,487,916 A | 1/1996 | Christensen |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,726,415 A | 3/1998 | Luo et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,001,426 A | 12/1999 | Witherspoon et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,365,016 B1 | 4/2002 | Iacovangelo et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,444,298 B1 | 9/2002 | Tadokoro et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 | 12/2002 | He |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zornes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 | 8/2004 | Kodas et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 | 6/2006 | Hampden-Smith et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 | 8/2006 | Kodas et al. |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |

(56) References Cited

U.S. PATENT DOCUMENTS

| | | |
|---|---|---|
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKeclutie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,897,536 B2 | 3/2011 | Saito et al. |
| 7,902,104 B2 | 3/2011 | Kalck |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,176,830 B1 | 5/2012 | Tan |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,518,846 B2 | 8/2013 | Uchikawa et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | Van Den Hoek et al. |
| 8,679,433 B2 | 3/2014 | Yin et al. |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,927,403 B2 | 1/2015 | Huotari et al. |
| 8,932,514 B1 | 1/2015 | Yin et al. |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | Van Den Hoek et al. |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0007092 A1 | 1/2004 | Yoshimura |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0178530 A1 | 9/2004 | Yadav |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |

(56) References Cited

U.S. PATENT DOCUMENTS

| | | |
|---|---|---|
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0119398 A1 | 6/2005 | Zhang |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222777 A1 | 10/2006 | Skoog et al. |
| 2006/0222780 A1 | 10/2006 | Gurevich et al. |
| 2006/0231525 A1 | 10/2006 | Asakawa et al. |
| 2007/0009752 A1 | 1/2007 | Lefebvre et al. |
| 2007/0014919 A1 | 1/2007 | Hamalainen et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1 | 11/2007 | Kear et al. |
| 2007/0266825 A1 | 11/2007 | Ripley et al. |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0107586 A1 | 5/2008 | Smalley et al. |
| 2008/0108005 A1 | 5/2008 | Carpenter |
| 2008/0116118 A1 | 5/2008 | Zhu et al. |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0268270 A1 | 10/2008 | Chen et al. |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0080592 A1 | 3/2009 | Arsenlis et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0089742 A1 | 4/2010 | Suslov |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0180820 A1 | 7/2010 | Ishimaru et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0283013 A1 | 11/2010 | Sato et al. |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0052698 A1 | 3/2011 | Benoit et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel, Jr. et al. |

(56) References Cited

U.S. PATENT DOCUMENTS

| | | |
|---|---|---|
| 2011/0180750 A1 | 7/2011 | Kleine Jaeger et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | Van Den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | Van Den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0141236 A1 | 5/2015 | Yin et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0217229 A1 | 8/2015 | Yin et al. |
| 2015/0266002 A1 | 9/2015 | Biberger et al. |
| 2015/0314260 A1 | 11/2015 | Biberger |
| 2015/0314581 A1 | 11/2015 | Biberger |
| 2015/0367331 A1 | 12/2015 | Biberger |
| 2016/0045867 A1 | 2/2016 | Kearl et al. |
| 2016/0067679 A1 | 3/2016 | Yin et al. |

FOREIGN PATENT DOCUMENTS

| | | |
|---|---|---|
| CN | 101301610 A | 11/2008 |
| DE | 34 45 273 A1 | 6/1986 |
| EP | 0 223 104 A1 | 5/1987 |
| EP | 0 347 386 A1 | 12/1989 |
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A | 5/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-170043 A | 6/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-181484 A | 7/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| JP | 2007-222732 A | 9/2007 |
| JP | 2007-253037 A | 10/2007 |
| JP | 2009-254929 A | 11/2009 |
| JP | 2009-279544 A | 12/2009 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/16882 | 3/2000 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |

(56) References Cited

FOREIGN PATENT DOCUMENTS

| | | |
|---|---|---|
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |
| WO | WO-2016/033517 A1 | 3/2016 |

OTHER PUBLICATIONS

Babin, A. et al. (1985). "Solvents Used in the Arts," *Center for Safety in the Arts*: 16 pages.

Bateman, J. E. et al. (Dec. 17, 1998). "Alkylation of Porous Silicon by Direct Reaction with Alkenes and Alkynes," *Angew. Chem Int. Ed.* 37(19):2683-2685.

Birlik, I. et al. (Jun. 15, 2010). "Nanoparticle Doped YBCO Films Prepared by Chemical Solution Deposition Method," *6th Nanoscience and Nanotechnology Conference*, Izmir, Turkey: 1 page.

Büchel, R. et al. (2009). "Influence of Pt Location on $BaCO_3$ or $Al_2O_3$ During $NO_x$ Storage Reduction," *Journal of Catalysis* 261: 201-207.

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline $Y_2O_3$ Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.

Cospheric LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Faber, K. T. et al. (Sep. 1988). "Toughening by Stress-Induced Microcracking in Two-Phase Ceramics," Journal of the American Ceramic Society 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," Revue Générale De L'Electricité, RGE, Paris, France, No. 2, pp. 7-12 (in French). (Submit with Machine translation).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles,"*Chemical Physics Letters* 221:363-367.

Fojtik, A. (Jan. 13, 2006). "Surface Chemistry of Luminescent Colloidal Silicon Nanoparticles," *J. Phys. Chem. B*. 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:p. 9.1.1-p. 9.1.6.

Heberlein, J. (2002). "New Approaches in Thermal Plasma Technology", *Pure Appl. Chem*. 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Jensen, J. et al. (2000). "Preparation of $ZnO$—$Al_2O_3$ Particles in a Premixed Flame," *Journal of Nanoparticle Research* 2: 363-373.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater*.17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu—Bi Alloys Prepared by Co-Evaporation in a Continuous Gas Flow," *NanoStructured Materials* 7(6):605-610.

Kim, N. Y. et al. (Mar. 5, 1997). "Thermal Derivatization of Porous Silicon with Alcohols," *J. Am. Chem. Soc*. 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt-Rh Catalysts: I. Microstructural Characterization," *Journal of Catalysis* 154: 261-275.

Lamouroux, E. et al. (2007). "Identification of Key Parameters for the Selective Growth of Single or Double Wall Carbon Nanotubes on $FeMo/Al_2O_3$ CVD Catalysts," *Applied Catalysts A: General* 323: 162-173.

Langner, A. et al. (Aug. 25, 2005). "Controlled Silicon Surface Functionalization by Alkene Hydrosilylation," *J. Am. Chem. Soc*. 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, J-G. et al. (2009). "Cobalt-Doped $TiO_2$ Nanocrystallites: Radio-Frequency Thermal Plasma Processing, Phase Structure, and Magnetic Properties," *J. Phys. Chem*. 113 (19): 8009-8015.

Li, X. et al. (May 25, 2004). "Surface Functionalization of Silicon Nanoparticles Produced by Laser-Driven Pyrolysis of Silane Followed by HF-$HNO_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc*. 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater*. 18(3):637-642.

Luo, J. et al. (2008). "Core/Shell Nanoparticles as Electrocatalysts for Fuel Cell Reactions," *Advanced Materials* 20: 4342-4347.

Magdassi, S. et al. (Apr. 2010). "Triggering the Sintering of Silver Nanoparticles at Room Temperature," *ACS Nano* 4(4): 1943-1948.

Martinez-Hansen, V. et al. (2009). "Development of Aligned Carbon Nanotubes Layers Over Stainless Steel Mesh Monoliths," *Catalysis Today* 147S: S71-S75.

(56) References Cited

OTHER PUBLICATIONS

Mignard, D. et al. (2003). "Methanol Synthesis from Flue-Gas $CO_2$ and Renewable Electricity: A Feasibility Study," *International Journal of Hydrogen Energy* 28: 455-464.

Múhlenweg, H. et al. (2004). "Gas-Phase Reactions—Open Up New Roads to Nanoproducts," *Degussa ScienceNewsletter* No. 08, pp. 12-16.

Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.

NASA (2009). "Enthalpy," Article located at http://www.grc.nasa.gov/WWW/K-12/airplane/enthalpy.htrnl, published by National Aeronautics and Space Administration on Nov. 23, 2009, 1 page.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.

Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.

"Plasma Spray and Wire Flame Spray Product Group," located at http://www.processmaterials.com/spray.html, published by Process Materials, Inc., last accessed Aug. 5, 2013, 2 pages.

"Platinum Group Metals: Annual Review 1996" (Oct. 1997). Engineering and Mining Journal, p. 63.

Rahaman, R. A. et al. (1995). "Synthesis of Powders," in *Ceramic Processing and Sintering*. Marcel Decker, Inc. New York, pp. 71-77.

Sailor, M. J. (1997). "Surface Chemistry of Luminescent Silicon Nanocrystallites," *Adv. Mater.* 9(10):783-793.

Schimpf, S. et al. (2002). "Supported Gold Nanoparticles: In-Depth Catalyst Characterization and Application in Hydrogenation and Oxidation Reactions," *Catalysis Today* 2592: 1-16.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Strobel, R. et al. (2003). "Flame-made Platinum/Alumina: Structural Properties and Catalytic Behaviour in Enantioselective Hydrogenation," *Journal of Catalysis* 213: 296-304.

Subramanian, S. et al. (1991). "Structure and Activity of Composite Oxide Supported Platinum—Iridium Catalysts," *Applied Catalysts* 74: 65-81.

Tao, Y.-T. (May 1993). "Structural Comparison of Self-Assembled Monolayers of n-Alkanoic Acids on the surfaces of Silver, Copper, and Aluminum," *J. Am. Chem. Soc.* 115(10):4350-4358.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.

Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.

Vardelle, M. et al. (Jun. 1991). "Experimental Investigation of Powder Vaporization in Thermal Plasma Jets," *Plasma Chemistry and Plasma Processing* 11(2):185-201.

Viswanathan, V. et al. (2006). "Challenges and Advances in Nanocomposite Processing Techniques," *Materials Science and Engineering* R 54: 121-285.

Wan, J. et al. (2005). "Spark Plasma Sintering of Silicon Nitride/Silicon Carbide Nanocomposites with Reduced Additive Amounts," *Scripta Materialia* 53: 663-667.

Yoshida, T. (1994). "The Future of Thermal Plasma Processing for Coating", *Pure & Appl. Chem.* 66(6):1223-1230.

Zou, J. et al. (Jun. 4, 2004). "Solution Synthesis of Ultrastable Luminescent Siloxane-Coated Silicon Nanoparticles," *Nano Letters* 4(7):1181-1186.

Non-Final Office Action mailed Mar. 7, 2014, for U.S. Appl. No. 12/968,253, filed Dec. 14, 2010, for Biberger, 15 pages.

International Search Report mailed Dec. 20, 2012, for PCT Patent Application No. PCT/US2012/025966, filed Feb. 21, 2012, published on Aug. 30, 2012, as WO-2012/115977; 3 pages.

Written Opinion mailed on Dec. 20, 2012, for PCT Patent Application No. PCT/US2012/025966, filed Feb. 21, 2012, published on Aug. 30, 2012, as WO-2012/115977; 4 pages.

International Preliminary Report on Patentability dated Aug. 27, 2013, for PCT Patent Application No. PCT/US2012/025966, filed Feb. 21, 2012, published on Aug. 30, 2012, as WO-2012/115977; 5 pages.

U.S. Appl. No. 12/152,084, filed May 9, 2008, for Biberger.
U.S. Appl. No. 13/028,693, filed Feb. 16, 2011, for Biberger.
U.S. Appl. No. 12/152,111, filed May 9, 2008, for Biberger et al.
U.S. Appl. No. 12/968,239, filed Dec. 14, 2010, for Biberger.
U.S. Appl. No. 12/969,128, filed Dec. 15, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.

WET CHEMICAL AND PLASMA METHODS OF FORMING STABLE PTPD CATALYSTS

CROSS-REFERENCE TO RELATED APPLICATIONS

This application is a continuation of U.S. patent application Ser. No. 14/175,894, filed on Feb. 7, 2014, pending, which is a continuation of U.S. patent application Ser. No. 13/033,514 filed Feb. 23, 2011, now issued as U.S. Pat. No. 8,669,202.

FIELD OF THE INVENTION

The present invention relates to the field of catalysts. More specifically, the present invention relates to a method of producing a catalyst.

BACKGROUND OF THE INVENTION

Wet chemistry can be used to put small platinum particles on a ceramic surface in order to create a catalyst. However, when the catalyst is heated up and used, the platinum particles are not sufficiently bonded to the ceramic surface. As a result, they are mobile, allowing them to move around and find other platinum particles. Upon the platinum particles' discovery of each other, they agglomerate into bigger platinum particles.

For example, even if prior art processes start with ½ nanometer platinum particles, by the time the aging test has been performed (equivalent to 10 years on a car), the platinum particles have agglomerated to become 16 nanometer particles.

This agglomeration of platinum particles results in a massive reduction in catalytic surface area. As a result, the performance of the catalyst significantly decreases.

SUMMARY OF THE INVENTION

The present invention employs a pinning agent to securely bond catalytic material to a core nano-particle. The pinning agent securely anchors the catalytic material to the core nano-particle, thereby minimizing or eliminating the mobility and agglomeration of the catalytic material. As a result, the present invention is able to provide a minimally-aging or even a non-aging catalyst that substantially maintains the extremely small size of the catalytic particles on each core nano-particle, thereby maximizing the catalytic surface area.

In one aspect of the present invention, a nano-particle is comprises an interior region and an exterior surface. The interior region comprises a mixed-metal oxide, wherein the mixed-metal oxide comprises aluminum oxide and palladium. The exterior surface comprises pure metallic palladium.

In some embodiments, the palladium in the interior region extends to and is bonded with the pure metallic palladium at the exterior surface. In some embodiments, the nano particle comprises a diameter of approximately 10 nanometers or less.

In some embodiments, the mixed-metal oxide forms a center core of the nano-particle. In some embodiments, the mixed-metal oxide consists only of aluminum oxide and palladium.

In some embodiments, the mixed-metal oxide forms a monolayer that surrounds a center core of the nano-particle. In some embodiments, the center core comprises silica.

In another aspect of the present invention, a method of forming nano-particles comprises: loading a quantity of aluminum oxide material and a quantity of palladium material into a plasma gun in a desired ratio; vaporizing the quantity of aluminum oxide material and the quantity of palladium material using the plasma gun, thereby forming a vapor cloud comprising vaporized aluminum oxide and vaporized palladium; and quenching the vapor cloud, thereby condensing the vaporized aluminum oxide and the vaporized palladium into nano-particles. Each nano-particle comprises an interior region and an exterior surface. The interior region comprises a mixed-metal oxide that includes aluminum oxide and palladium, and the exterior surface comprises pure metallic palladium.

In some embodiments, the step of vaporizing the quantity of aluminum oxide material and the quantity of palladium material comprises: flowing a working gas into a reactor of the plasma gun; delivering energy to the working gas, thereby forming a plasma stream; and flowing the quantity of aluminum oxide material and the quantity of palladium material into the plasma stream.

In some embodiments, the palladium in the interior region extends to and is bonded with the pure metallic palladium at the exterior surface. In some embodiments, the nano-particles have an average grain size of approximately 10 nanometers or less.

In some embodiments, the mixed-metal oxide forms a center core of the nano-particle. In some embodiments, the mixed-metal oxide consists only of aluminum oxide and palladium.

In yet another aspect of the present invention, a method of forming nano-particles comprises: providing a quantity of aluminum material and a quantity of palladium material in a desired ratio; and forming a plurality of nano-particles from the quantity of aluminum material and the quantity of palladium material using a wet chemistry process. Each formed nano-particle comprises an interior region and an exterior surface. The interior region comprises a mixed-metal oxide that includes aluminum oxide and palladium, and the exterior surface comprises pure metallic palladium.

In some embodiments, the aluminum material is a salt or an organic compound, the palladium material is a salt, and the wet chemistry process comprises forming the mixed-metal oxide from the aluminum material and the palladium material via a chemical reaction. In some embodiments, the mixed-metal oxide forms a center core of each nano-particle, and the mixed-metal oxide consists only of aluminum oxide and palladium.

In some embodiments, the step of forming the plurality of nano-particles using a wet chemistry process comprises forming a monolayer around a center core of each nano-particle, the monolayer comprising the mixed-metal oxide. In some embodiments, the center core of each nano-particle comprises silica.

In some embodiments, the palladium in the interior region extends to and is bonded with the pure metallic palladium at the exterior surface. In some embodiments, the nano-particles have an average grain size of approximately 10 nanometers or less.

In yet another aspect of the present invention, a catalytic carrier nano-particle comprises a carrier nano-particle comprising an interior region and an exterior surface. The interior region comprises a mixed-metal oxide that includes aluminum oxide and palladium, and the exterior surface comprises pure metallic palladium. A catalytic nano-particle is bonded to the pure metallic palladium at the exterior surface. The catalytic nano-particle is platinum.

In some embodiments, the palladium in the interior region extends to and is bonded with the pure metallic palladium at the exterior surface. In some embodiments, the carrier nano-particle comprises a diameter of approximately 10 nanometers or less.

In some embodiments, the mixed-metal oxide forms a center core of the carrier nano-particle. In some embodiments, the mixed-metal oxide consists only of aluminum oxide and palladium.

In some embodiments, the mixed-metal oxide forms a monolayer that surrounds a center core of the carrier nano-particle. The nano-particle of claim 26, wherein the center core comprises silica.

In yet another aspect of the present invention, a method of forming nano-particles comprises: loading a quantity of aluminum oxide material, a quantity of palladium material, and a quantity of platinum material into a plasma gun in a desired ratio; vaporizing the quantity of aluminum oxide material, the quantity of palladium material, and the quantity of platinum material using the plasma gun, thereby forming a vapor cloud comprising vaporized aluminum oxide, vaporized palladium, and vaporized platinum; and quenching the vapor cloud, thereby condensing the vaporized aluminum oxide, the vaporized palladium, and the vaporized platinum into carrier nano-particles. Each carrier nano-particle comprises an interior region and an exterior surface. The interior region comprises a mixed-metal oxide that includes aluminum oxide and palladium, the exterior surface comprises a pure metallic palladium, and a platinum nano-particle is bonded to the pure metallic palladium at the exterior surface.

In some embodiments, the step of vaporizing the quantity of aluminum oxide material, the quantity of palladium material, and the quantity of platinum material comprises: flowing a working gas into a reactor of the plasma gun; delivering energy to the working gas, thereby forming a plasma stream; and flowing the quantity of aluminum oxide material, the quantity of palladium material, and the quantity of platinum material into the plasma stream.

In some embodiments, the palladium in the interior region extends to and is bonded with the pure metallic palladium at the exterior surface. In some embodiments, the carrier nano-particles have an average grain size of approximately 10 nanometers or less.

In some embodiments, the mixed-metal oxide forms a center core of the carrier nano-particle. In some embodiments, the mixed-metal oxide consists only of aluminum oxide and palladium.

In yet another aspect of the present invention, a method of forming nano-particles comprises: providing a quantity of aluminum material, a quantity of palladium material, and a quantity of platinum material in a desired ratio; and forming a plurality of carrier nano-particles from the quantity of aluminum material, the quantity of palladium material, and the quantity of platinum material using a wet chemistry process. Each carrier nano-particle comprises an interior region and an exterior surface. The interior region comprises a mixed-metal oxide that includes aluminum oxide and palladium, the exterior surface comprises a pure metallic palladium, and a platinum nano-particle is bonded to the pure metallic palladium at the exterior surface.

In some embodiments, the aluminum material is a salt or an organic compound, the palladium material is a salt, and the wet chemistry process comprises forming the mixed-metal oxide from the aluminum material and the palladium material via a chemical reaction, and forming a carrier particle suspension comprising a plurality of aluminum-palladium carrier particles. Each aluminum-palladium carrier particle comprises an interior region and an exterior surface. The interior region comprises the mixed-metal oxide that includes aluminum oxide and palladium, and the exterior surface comprises pure metallic palladium. In some embodiments, the wet chemistry process further comprises mixing a platinum solution with the carrier particle suspension, and bonding platinum nano-particles formed from the platinum solution to the pure metallic palladium on the aluminum-palladium carrier particles. In some embodiments, the platinum solution is a platinum nitrate solution or a platinum chloride solution.

In some embodiments, the aluminum material is a salt or an organic compound, the palladium material is a salt, and the wet chemistry process comprises forming the mixed-metal oxide from the aluminum material and the palladium material via a chemical reaction, forming a monolayer of the mixed-metal oxide around a center core of each carrier nano-particle, and forming a suspension of the carrier nano-particles. The center core comprises a different chemical composition from the monolayer, and each monolayer comprises an interior region and an exterior surface. The interior region comprises the mixed-metal oxide that includes aluminum oxide and palladium, and the exterior surface comprises pure metallic palladium. In some embodiments, the wet chemistry process further comprises mixing a platinum solution with the suspension of nano-particles, and bonding platinum nano-particles formed from the platinum solution to the pure metallic palladium on the carrier nano-particles. In some embodiments, the platinum solution is a platinum nitrate solution or a platinum chloride solution. In some embodiments, the center core of each carrier nano-particle comprises silica.

In some embodiments, the palladium in the interior region extends to and is bonded with the pure metallic palladium-platinum alloy at the exterior surface. In some embodiments, the carrier nano-particles have an average grain size of approximately 10 nanometers or less.

In yet another aspect of the present invention, a method of forming nano-particles comprises: forming a plurality of aluminum-palladium carrier particles using a plasma gun, wherein each aluminum-palladium carrier particle comprises an interior region and an exterior surface, the interior region comprising a mixed-metal oxide that includes aluminum oxide and palladium, and the exterior surface comprising pure metallic palladium; and affixing a platinum nano-particle to the pure metallic palladium on each of the aluminum-palladium carrier particles using a wet chemistry process.

In some embodiments, forming the plurality of aluminum-palladium carrier particles using the plasma gun comprises: loading a quantity of aluminum oxide material and a quantity of palladium material into the plasma gun in a desired ratio; vaporizing the quantity of aluminum oxide material and the quantity of palladium material using the plasma gun, thereby forming a vapor cloud comprising vaporized aluminum oxide and vaporized palladium; and quenching the vapor cloud, thereby condensing the vaporized aluminum oxide and the vaporized palladium into carrier nano-particles. Each carrier nano-particle comprises an interior region and an exterior surface. The interior region comprises a mixed-metal oxide that includes aluminum oxide and palladium, and the exterior surface comprises pure metallic palladium.

In some embodiments, the step of vaporizing the quantity of aluminum oxide material and the quantity of palladium material comprises flowing a working gas into a reactor of the plasma gun, delivering energy to the working gas, thereby forming a plasma stream, and flowing the quantity of aluminum oxide material and the quantity of palladium material into the plasma stream. In some embodiments, the palladium in the interior region extends to and is bonded with the pure metallic palladium at the exterior surface. In some embodiments, the aluminum-palladium carrier particles have an average grain size of approximately 10 nanometers or less.

In some embodiments, the mixed-metal oxide forms a center core of each aluminum-palladium carrier particle. In some embodiments, the mixed-metal oxide consists only of aluminum oxide and palladium.

In some embodiments, the wet chemistry process comprises mixing a platinum solution with the aluminum-palladium carrier particles, and bonding platinum nano-particles formed from the platinum solution to the pure metallic palladium on the aluminum-palladium carrier particles. In some embodiments, the platinum solution is a platinum nitrate solution or a platinum chloride solution.

In some embodiments, the palladium in the interior region extends to and is bonded with the pure metallic palladium at the exterior surface. In some embodiments, the aluminum-palladium carrier particles have an average grain size of approximately 10 nanometers or less.

In yet another aspect of the present invention, a catalyst comprises a support structure, and a plurality of carrier nano-particles bonded to the support structure. Each carrier nano-particle comprises an interior region and an exterior surface. The interior region comprises a mixed-metal oxide, and the exterior surface comprises a pure metal. A catalytic particle is bonded with the pure metal at the exterior surface.

In some embodiments, the support structure is a porous ceramic material, and the plurality of carrier nano-particles are disposed within the pores of the ceramic material. In some embodiments, the mixed-metal oxide comprises aluminum oxide and palladium. In some embodiments, the pure metal is palladium. In some embodiments, the mixed-metal oxide in the interior region extends to and is bonded with the pure metal at the exterior surface. In some embodiments, the carrier nano-particles have an average grain size of approximately 10 nanometers or less.

In some embodiments, the mixed-metal oxide forms a center core of each carrier nano-particle. In some embodiments, the mixed-metal oxide consists only of aluminum oxide and palladium.

In some embodiments, the mixed-metal oxide forms a monolayer that surrounds a center core of each carrier nano-particle. In some embodiments, the center core comprises silica.

In some embodiments, the exterior surface comprises a pure metal alloy. In some embodiments, the catalytic particle is platinum. In some embodiments, the catalyst is a non-aging catalyst.

In yet another aspect of the present invention, a method of forming a catalyst comprises: providing a support structure; providing a plurality of carrier nano-particles, wherein each carrier nano-particle comprises an interior region and an exterior surface, the interior region comprising a mixed-metal oxide, and the exterior surface comprising a pure metal, wherein a catalytic particle is bonded with the pure metal at the exterior surface; and bonding the plurality of carrier nano-particles to the support structure.

In some embodiments, the support structure is a porous ceramic material, and the plurality of carrier nano-particles are disposed within the pores of the ceramic material. In some embodiments, the mixed-metal oxide includes aluminum oxide and palladium, and the pure metal comprises pure metallic palladium. In some embodiments, the catalytic particle is platinum. In some embodiments, the palladium in the interior region extends to and is bonded with the pure metallic palladium at the exterior surface. In some embodiments, the carrier nano-particles have an average grain size of approximately 10 nanometers or less.

In some embodiments, the mixed-metal oxide forms a center core of the carrier nano-particle. In some embodiments, the mixed-metal oxide consists only of aluminum oxide and palladium.

In some embodiments, the step of providing a plurality of carrier nano-particles comprises: loading a quantity of a first material, a quantity of a second material, and a quantity of a third material into a plasma gun in a desired ratio; vaporizing the quantity of the first material, the quantity of the second material, and the quantity of the third material using the plasma gun, thereby forming a vapor cloud comprising vaporized first material, vaporized second material, and vaporized third material; and quenching the vapor cloud, thereby condensing the vaporized first material, the vaporized second material, and the vaporized third material into carrier nano-particles. Each carrier nano-particle comprises the interior region and the exterior surface. In some embodiments, the step of vaporizing the quantity of the first material, the quantity of the second material, and the quantity of the third material comprises flowing a working gas into a reactor of the plasma gun, delivering energy to the working gas, thereby forming a plasma stream, and flowing the quantity of the first material, the quantity of the second material, and the quantity of the third material into the plasma stream.

In some embodiments, the step of providing a plurality of carrier nano-particles comprises: providing a quantity of a first material, a quantity of a second material, and a quantity of third material in a desired ratio; and forming the plurality of carrier nano-particles from the quantity of the first material, the quantity of the second material, and the quantity of the third material using a wet chemistry process. In some embodiments, the mixed-metal oxide comprises the first material and the second material, the exterior surface comprises the second material, and the catalytic particle comprises the third material. In some embodiments, the wet chemistry process comprises forming the mixed-metal oxide from the first material and the second material via a chemical reaction, and forming a carrier particle suspension comprising a plurality of carrier particles. Each carrier particle comprises the interior region and the exterior surface, the mixed-metal oxide of the interior region comprising the first material and the second material, and the pure metal at the exterior surface comprising the second material.

In some embodiments, the first material is an aluminum material, and the second material is a palladium material. In some embodiments, the aluminum material is a salt or an organic compound, and the palladium material is a salt.

In some embodiments, the wet chemistry process further comprises mixing a catalytic solution with the carrier particle suspension, and bonding catalytic nano-particles formed from the catalytic solution to the pure metal on the carrier particles. In some embodiments, the catalytic solution is a platinum solution and the catalytic nano-particles are platinum nano-particles. In some embodiments, the platinum solution is a platinum nitrate solution or a platinum chloride solution.

In some embodiments, forming the mixed-metal oxide comprises forming a monolayer around a center core of each carrier particle. The center core comprises a different chemical composition from the monolayer, and each monolayer comprises the interior region and the exterior surface. In some embodiments, the mixed-metal oxide includes aluminum oxide and palladium, and the pure metal at the exterior surface comprises palladium. In some embodiments, the wet chemistry process further comprises mixing a catalytic solution with the carrier particle suspension, and bonding catalytic nano-particles formed from the catalytic solution to the pure metal on the carrier particles. In some embodiments, the catalytic solution is a platinum solution and the catalytic nano-particles are platinum nano-particles. In some embodiments, the platinum solution is a platinum nitrate solution or a platinum chloride solution. In some embodiments, the center core of each carrier nano-particle comprises silica.

In some embodiments, the step of providing the plurality of carrier nano-particles comprises: forming a plurality of carrier particles using a plasma gun, wherein each carrier particle comprises the interior region and the exterior surface; and affixing a catalytic nano-particle to the pure metal on each of the carrier particles using a wet chemistry process. In some embodiments, the step of forming the plurality of carrier particles using the plasma gun comprises: loading a quantity of a first material and a quantity of a second material into the plasma gun in a desired ratio; vaporizing the quantity of the first material and the quantity of the second material using the plasma gun, thereby forming a vapor cloud comprising vaporized first material and vaporized second material; and quenching the vapor cloud, thereby condensing the vaporized first material and the vaporized second material into the carrier particles. In some embodiments, the step of vaporizing the quantity of first material and the quantity of second material comprises: flowing a working gas into a reactor of the plasma gun; delivering energy to the working gas, thereby forming a plasma stream; and flowing the quantity of first material and the quantity of second material into the plasma stream. In some embodiments, the step of affixing a catalytic nano-particle to the pure metal using a wet chemistry process comprises mixing a catalytic solution with the core particles, and bonding catalytic nano-particles formed from the catalytic solution to the pure metal on the carrier particles. In some embodiments, the catalytic solution is a platinum solution and the catalytic nano-particles are platinum nano-particles. In some embodiments, the platinum solution is a platinum nitrate solution or a platinum chloride solution. In some embodiments, bonding the plurality of carrier nano-particles to the support structure comprises performing a calcining process.

In yet another aspect of the present invention, a nano-particle comprises an interior region comprising a mixed-metal oxide, and an exterior surface comprising a pure metal.

In some embodiments, the mixed-metal oxide comprises aluminum oxide and palladium. In some embodiments, the pure metal is palladium. In some embodiments, the mixed-metal oxide in the interior region extends to and is bonded with the pure metal at the exterior surface. In some embodiments, the nano-particle comprises a diameter of approximately 10 nanometers or less.

In some embodiments, the mixed-metal oxide forms a center core of the nano-particle. In some embodiments, the mixed-metal oxide consists only of aluminum oxide and palladium.

In some embodiments, the mixed-metal oxide forms a monolayer that surrounds a center core of the nano-particle. In some embodiments, the center core comprises silica. In some embodiments, the exterior surface comprises a pure metal alloy. In some embodiments, the pure metal alloy is a palladium-platinum alloy.

In yet another aspect of the present invention, a method of forming nano-particles comprises providing a quantity of a first material and a quantity of a second material, and forming a plurality of nano-particles from the quantity of the first material and the quantity of the second material. Each nano-particle comprises an interior region and an exterior surface. The interior region comprises a mixed-metal oxide, and the exterior surface comprises a pure metal.

In some embodiments, the mixed-metal oxide comprises the first material and the second material, and the pure metal comprises the second material. In some embodiments, the mixed-metal oxide comprises aluminum oxide and palladium, and the pure metal comprises palladium. In some embodiments, the mixed-metal oxide comprises aluminum oxide and palladium, and the pure metal comprises a palladium-platinum alloy.

In some embodiments, the step of forming the plurality of nano-particles comprises: loading the quantity of the first material and the quantity of the second material into a plasma gun in a desired ratio; vaporizing the quantity of the first material and the quantity of the second material using the plasma gun, thereby forming a vapor cloud comprising vaporized first material and vaporized second material; and quenching the vapor cloud, thereby condensing the vaporized first material and the vaporized second material into nano-particles, wherein each nano-particle comprises the interior region and the exterior surface. In some embodiments, the step of vaporizing the quantity of the first material and the quantity of the second material comprises: flowing a working gas into a reactor of the plasma gun; delivering energy to the working gas, thereby forming a plasma stream; and flowing the quantity of the first material and the quantity of the second material into the plasma stream. In some embodiments, the mixed-metal oxide comprises the first material and the second material, and the pure metal comprises the second material. In some embodiments, the first material is an aluminum material and the second material is a palladium material.

In some embodiments, the step of forming the plurality of nano-particles comprises performing a wet chemistry process with the quantity of first material and the quantity of second material. In some embodiments, the wet chemistry process comprises forming the mixed-metal oxide from the first material and the second material via a chemical reaction. In some embodiments, the first material comprises an aluminum material, and the second material comprises a palladium material. In some embodiments, the aluminum material is a salt or an organic compound, and the palladium material is a salt. In some embodiments, the mixed-metal oxide forms a center core of each nano-particle, and the mixed-metal oxide consists only of aluminum oxide and palladium. In some embodiments, the wet chemistry process comprises forming a monolayer around a center core of each nano-particle. The monolayer comprises the mixed-metal oxide. In some embodiments, the center core of each nano-particle comprises silica.

In some embodiments, the mixed-metal oxide in the interior region extends to and is bonded with the pure metal at the exterior surface. In some embodiments, the nano-particles have an average grain size of approximately 10 nanometers or less.

In yet another aspect of the present invention, a nano-particle comprises an interior region comprising a mixed-metal oxide, an exterior surface comprising a pure metal, and a catalytic particle affixed to the pure metal. The catalytic particle has a chemical composition different from the pure metal and the mixed-metal oxide.

In some embodiments, the mixed-metal oxide comprises a first material and a second material, the pure metal comprises the second material, and the catalytic particle comprises a third material. In some embodiments, the mixed-metal oxide forms a monolayer that surrounds a center core of the nano-particle. In some embodiments, the center core comprises silica.

In some embodiments, the mixed-metal oxide comprises aluminum-oxide and a metallic pinning agent that does not comprise platinum, the pure metal comprises the metallic pinning agent, and the catalytic particle comprises platinum. In some embodiments, the metallic pinning agent comprises copper, molybdenum, or cobalt. In some embodiments, the catalytic particle comprises a metal alloy. In some embodiments, the metal alloy is a palladium-platinum alloy. In some embodiments, the metallic pinning agent comprises copper, molybdenum, or cobalt, and the catalytic particle comprises a palladium-platinum alloy.

In some embodiments, the mixed-metal oxide in the interior region extends to and is bonded with the pure metal at the exterior surface. In some embodiments, the nano particle comprises a diameter of approximately 10 nanometers or less.

In some embodiments, the catalytic particle is a nano-particle. In some embodiments, the catalytic particle comprises a diameter of approximately 1 nanometer or less. In some embodiments, the catalytic particle comprises a diameter of approximately ½ nanometer.

In yet another aspect of the present invention, a method of forming a nano-particle comprising: providing a carrier nano-particle, wherein the carrier nano-particle comprises an interior region and an exterior surface, the interior region comprising a mixed-metal oxide, and the exterior surface comprising a pure metal; and affixing a catalytic particle to the pure metal, wherein the catalytic particle has a chemical composition different from the pure metal and the mixed-metal oxide.

In some embodiments, the mixed-metal oxide is formed from a first material and a second material, the pure metal is formed from the second material, and the catalytic particle is formed from a third material. In some embodiments, the mixed-metal oxide forms a monolayer that surrounds a center core of the carrier nano-particle. In some embodiments, the center core comprises silica.

In some embodiments, the mixed-metal oxide comprises aluminum-oxide and a metallic pinning agent that does not comprise platinum, the pure metal comprises the metallic pinning agent, and the catalytic particle comprises platinum. In some embodiments, the metallic pinning agent comprises copper, molybdenum, or cobalt. In some embodiments, the catalytic particle comprises a metal alloy. In some embodiments, the metal alloy is a palladium-platinum alloy. In some embodiments, the metallic pinning agent comprises copper, molybdenum, or cobalt, and the catalytic particle comprises a palladium-platinum alloy.

In some embodiments, the mixed-metal oxide in the interior region extends to and is bonded with the pure metal at the exterior surface. In some embodiments, the carrier nano-particle comprises a diameter of approximately 10 nanometers or less.

In some embodiments, the catalytic particle is a nano-particle. In some embodiments, the catalytic particle comprises a diameter of approximately 1 nanometer or less. In some embodiments, the catalytic particle comprises a diameter of approximately ½ nanometer.

In some embodiments, the steps of providing the carrier nano-particle and affixing the catalytic particle to the pure metal are performed using a plasma gun. In some embodiments, the steps of providing the carrier nano-particle and affixing the catalytic particle to the pure metal are performed using a wet chemistry process.

In some embodiments, providing the carrier nano-particle comprises loading a quantity of a first material and a quantity of a second material into a plasma gun in a desired ratio, vaporizing the quantity of the first material and the quantity of the second material, thereby forming a vapor cloud comprising vaporized first material and vaporized second material, and quenching the vapor cloud, thereby condensing the vaporized first material and the vaporized second material into the carrier nano-particle. The carrier nano-particle comprises the interior region and the exterior surface. In some embodiments, the step of vaporizing the quantity of the first material material and the quantity of the second material comprises flowing a working gas into a reactor of the plasma gun, delivering energy to the working gas, thereby forming a plasma stream, and flowing the quantity of the first material and the quantity of the second material into the plasma stream. In some embodiments, the step of affixing the catalytic particle to the pure metal is performed using a wet chemistry process. In some embodiments, the wet chemistry process comprises mixing a catalytic solution with the carrier nano-particle, and bonding a catalytic particle formed from the catalytic solution to the pure metal on the carrier nano-particle. In some embodiments, the catalytic solution is a platinum solution and the catalytic particle is a platinum nano-particle. In some embodiments, the platinum solution is a platinum nitrate solution or a platinum chloride solution.

In yet another aspect of the present invention, a method of forming catalytic nano-particles comprises: providing a plurality of carrier nano-particles, wherein each carrier nano-particle comprises an interior region and an exterior surface, the interior region comprising a mixed-metal oxide, and the exterior surface comprising a pure metal; and affixing a catalytic nano-particle to the pure metal on each carrier nano-particle.

In some embodiments, the step of affixing the catalytic nano-particle to the pure metal is performed using a plasma gun. In some embodiments, the step of affixing the catalytic nano-particle to the pure metal comprises: loading the plurality of nano-particles and a quantity of catalytic material into a plasma gun in a desired ratio, vaporizing the quantity of catalytic material, thereby forming a vapor cloud comprising vaporized catalytic material, and quenching the vapor cloud, thereby condensing the vaporized catalytic material into catalytic nano-particles that are bonded to the pure metal on the carrier nano-particles.

In some embodiments, the plurality of carrier nano-particles has an average grain size of approximately 10 nanometers or less. In some embodiments, each catalytic nano particle comprises a diameter of approximately 1 nanometer or less. In some embodiments, each catalytic nano-particle comprises a diameter of approximately ½ nanometer.

In some embodiments, the step of affixing the catalytic nano-particle to the pure metal is performed using a wet chemistry process. In some embodiments, the step of affixing a catalytic nano-particle to the pure metal using a wet chemistry process comprises mixing a catalytic solution with the plurality of carrier nano-particles, and bonding catalytic nano-particles formed from the catalytic solution to the pure metal on the plurality of carrier nano-particles. In some embodiments, the catalytic solution is a platinum solution and the catalytic nano-particles are platinum nano-particles. In some embodiments, the platinum solution is a platinum nitrate solution or a platinum chloride solution.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This disclosure provides several embodiments of the present invention. It is contemplated that any features from any embodiment can be combined with any features from any other embodiment. In this fashion, hybrid configurations of the illustrated and describer embodiments are well within the scope of the present invention.

This disclosure refers to both particles and powders. These two terms are equivalent, except for the caveat that a singular "powder" refers to a collection of particles. The present invention may apply to a wide variety of powders and particles. Powders that fall within the scope of the present invention may include, but are not limited to, any of the following: (a) nano-structured powders (nano-powders), having an average grain size less than 250 nanometers and an aspect ratio between one and one million; (b) submicron powders, having an average grain size less than 1 micron and an aspect ratio between one and one million; (c) ultra-fine powders, having an average grain size less than 100 microns and an aspect ratio between one and one million; and (d) fine powders, having an average grain size less than 500 microns and an aspect ratio between one and one million.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that certain method steps of the invention can be performed in alternative sequences to those disclosed in the flowcharts. Accordingly, the scope of the claims should not be limited to any specific order of method steps unless the order is explicitly required by the language of the claims.

Figure 1:
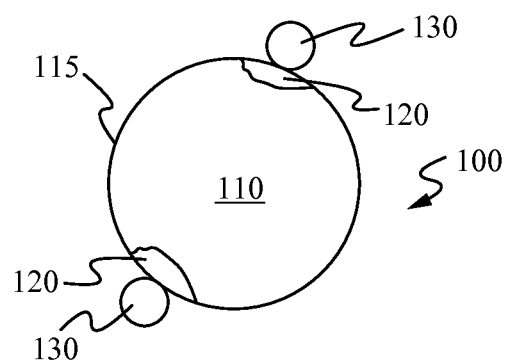
FIG. 1 illustrates a cross-sectional view of one embodiment of catalytic nano-particles bonded with a carrier nano-particle in accordance with the principles of the present invention.

FIG. 1 illustrates a cross-sectional view of one embodiment of catalytic nano-particles 130 bonded with a carrier nano-particle 100 in accordance with the principles of the present invention. The carrier nano-particle 100 comprises an interior region and an exterior surface 115. The exterior surface 115 defines the perimeter of the carrier nano-particle 100. In some embodiments, the carrier nano-particle 100 comprises a diameter of approximately 10 nanometers or less, which has been found to be an ideal size. Although, it is contemplated that other diameters are within the scope of the present invention.

The interior region is the region between the center of the carrier particle and the exterior surface 115. This interior region comprises a mixed-metal oxide 110. In some embodiments, the mixed-metal oxide 110 comprises aluminum oxide along with an accompanying metal. In some embodiments, this accompanying metal is palladium. Other accompanying metals that have been found to be suitable are copper, molybdenum, and cobalt. It is contemplated that other oxides and other metals may be used as well.

The exterior surface comprises one or more pure metal regions 120 consisting of pure metal. Metals that have been found to be suitable for these pure metal regions include palladium, copper, molybdenum, and cobalt. However, it is contemplated that other metals may be used as well. For the purposes of this disclosure, the terms "pure metal" and "pure metallic" should be interpreted to mean that the regions consist only of metal and are characterized by the absence of any other type of material. For example, the pure metal regions 120 may comprise a metal or a metal-metal alloy, but they may not comprise any ceramic material. The purpose of these purely metal regions 120 is to provide exposed regions at the exterior surface 115 of the carrier nano-particle 100 to which catalytic nano-particles 130 will have a strong attraction.

The catalytic nano-particles 130 are bonded, or otherwise affixed, to these pure metal regions 120. In some embodiments, these catalytic nano-particles 130 comprise or consist of platinum. In some embodiments, these catalytic nanoparticles 130 comprise or consist of a platinum alloy, such as a platinum-palladium alloy. However, it is contemplated that other catalytic materials may be used as well. In some embodiments, the catalytic nano-particles 130 have an average grain size of approximately 1 nanometer or less. In some embodiments, the catalytic nano-particles 130 have an average grain size of approximately ½ nanometer. However, it is contemplated that other sizes are within the scope of the present invention. Although FIG. 1 shows more than one pure metal region 120 on the carrier nano-particle 110 and more than one catalytic nano-particle 130 bonded to the carrier nano particle 110, it is contemplated that other quantities of these elements are within the scope of the present invention. For example, in some embodiments, the carrier nano-particle 110 comprises only one distinct pure metal region 120 and one distinct catalytic nano-particle 130 bonded to the carrier nano-particle 110. In some embodiments, the carrier nano-particle 110 comprises more than one distinct pure metal region 120 and more than one distinct catalytic nano-particle 130 bonded to the carrier nano-particle 110.

The pure metal regions 120 are bonded to the mixed-metal oxide 110 and act as pinning agents to securely affix the catalytic nano-particles 130 to the carrier nano-particle 100, thereby reducing or eliminating the mobility of the catalytic nano-particles 130 and preventing their agglomeration.

Figure 2:
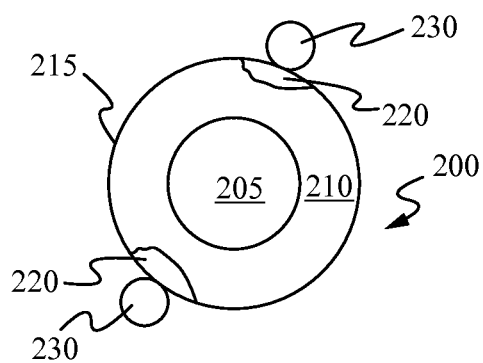
FIG. 2 illustrates a cross-sectional view of another embodiment of catalytic nano-particles bonded with a carrier nano-particle in accordance with the principles of the present invention.

FIG. 2 illustrates a cross-sectional view of one embodiment of catalytic nano-particles 230 bonded with a carrier nano-particle 200 in accordance with the principles of the present invention. The carrier nano-particle 200 comprises an interior region and an exterior surface 215. The exterior surface 215 defines the perimeter of the carrier nano-particle 200. In some embodiments, the carrier nano-particle 200 comprises a diameter of approximately 10 nanometers or less, which has been found to be an ideal size. Although, it is contemplated that other diameters are within the scope of the present invention.

The interior region is the region between the center of the carrier particle and the exterior surface 215. This interior region comprises a mixed-metal oxide 210. In some embodiments, the mixed-metal oxide 210 comprises aluminum oxide along with an accompanying metal. In some embodiments, this accompanying metal is palladium. Other accompanying metals that have been found to be suitable are copper, molybdenum, and cobalt. It is contemplated that other oxides and other metals may be used as well.

The embodiment of FIG. 2 is very similar to the embodiment of FIG. 1. However, in contrast to the interior region of carrier nano-particle 100, which is shown in FIG. 1 as comprising only the mixed-metal oxide 110 from its center to its exterior surface 115 and pure metal regions 120, the interior region of carrier nano-particle 200 is shown in FIG. 2 as having a center core 205 around which a monolayer of the mixed-metal oxide 210 is formed. In some embodiments, this center core 205 is formed from a ceramic material. In some embodiments, this center core 205 is formed from silica. However, it is contemplated that a other materials may be suitable to form the center core 205.

Similar to the exterior surface of carrier nano-particle 100, the exterior surface of carrier nano-particle 200 comprises one or more pure metal regions 220 consisting of pure metal. Metals that have been found to be suitable for these pure metal regions include palladium, copper, molybdenum, and cobalt. However, it is contemplated that other metals may be used as well. For the purposes of this disclosure, the terms "pure metal" and "pure metallic" should be interpreted to mean that the regions consist only of metal and are characterized by the absence of any other type of material. For example, the pure metal regions 220 may comprise a metal or a metal-metal alloy, but they may not comprise any ceramic material. The purpose of these purely metal regions 220 is to provide exposed regions at the exterior surface 215 of the carrier nano-particle 200 to which catalytic nano-particles 230 will have a strong attraction.

As discussed above with respect to the embodiment of FIG. 1, the catalytic nano-particles 230 are bonded, or otherwise affixed, to these pure metal regions 220. In some embodiments, these catalytic nano-particles 230 comprise or consist of platinum. In some embodiments, these catalytic nano-particles 230 comprise or consist of a platinum alloy, such as a platinum-palladium alloy. However, it is contemplated that other catalytic materials may be used as well. In some embodiments, the catalytic nano-particles 230 have an average grain size of approximately 1 nanometer or less. In some embodiments, the catalytic nano-particles 230 have an average grain size of approximately ½ nanometer. However, it is contemplated that other sizes are within the scope of the present invention. Although FIG. 2 shows more than one pure metal region 220 on the carrier nano-particle 210 and more than one catalytic nano-particle 230 bonded to the carrier nano-particle 210, it is contemplated that other quantities of these elements are within the scope of the present invention. For example, in some embodiments, the carrier nano-particle 210 comprises only one distinct pure metal region 220 and one distinct catalytic nano-particle 230 bonded to the carrier nano-particle 210. In some embodiments, the carrier nano-particle 210 comprises more than one distinct pure metal region 220 and more than one distinct catalytic nano-particle 230 bonded to the carrier nano-particle 210.

As previously discussed with respect to the embodiment of FIG. 1, the pure metal regions 220 are bonded to the mixed-metal oxide 210 and act as pinning agents to securely affix the catalytic nano-particles 230 to the carrier nano-particle 200, thereby reducing or eliminating the mobility of the catalytic nano-particles 230 and preventing their agglomeration.

Whether it is with respect to the embodiments of FIGS. 1-2 or some other embodiment within the scope of the present invention, the chemical and structural compositions of the elements can vary. For example, in some embodiments, the mixed-metal oxide comprises or consists of aluminum oxide, the pure metal regions comprise or consist of palladium, and the catalytic particles comprise or consist of platinum. In some embodiments, the interior region consists only of the mixed-metal oxide. In some embodiments, the interior region comprises a ceramic center core surrounded by a monolayer of mixed-metal oxide. In some embodiments, the pure metal comprises or consists of a metal other than palladium, such as copper, molybdenum, or cobalt. In some embodiments, the catalytic particles comprise or consist of a palladium-platinum alloy. In some embodiments, the pure metal comprises or consists of a metal other than palladium, such as copper, molybdenum, or cobalt, and the catalytic particles comprise or consist of a palladium-platinum alloy.

Whether it is with respect to the embodiments of FIGS. 1-2 or some other embodiment within the scope of the present invention, the bonding of one or more of the catalytic nano-particles with the carrier nano-particle defines the formation of catalytic carrier nano-particles. These catalytic carrier nano-particles can be impregnated or otherwise affixed onto a catalyst support in order to form a usable catalyst. In some embodiments, the catalyst support is a ceramic material. In some embodiments, the catalyst support is an oxide material. In some embodiments, the catalyst support is a monolith. In some embodiments, the catalyst support is an extrudate. Such supports have found utility due to their highly accessible and large surface area, as high as 250 m²/g. In some embodiments, the catalyst support is a macroscopic support particle. In such an embodiment, the size of the macroscopic support particle is selected to provide maximum surface area to which the catalytic carrier nano-particles are bonded or fixed. In some embodiments, the catalyst support is a porous structure.

In some embodiments, the mixed-metal oxide 210 can be anything between a partial monolayer and multiple monolayers. In some embodiments, pure metal regions 220 can be anything between a metal atom partially bonded to oxygen atoms in the matrix, with at least one bonding site to anchor a metal particle, and a metal atom cluster with one or more atoms incorporated in the mixed-metal oxide and one or more pure metal atoms available to alloy with a metallic catalysis particle (e.g., a platinum nano-particle).

Figure 3A:
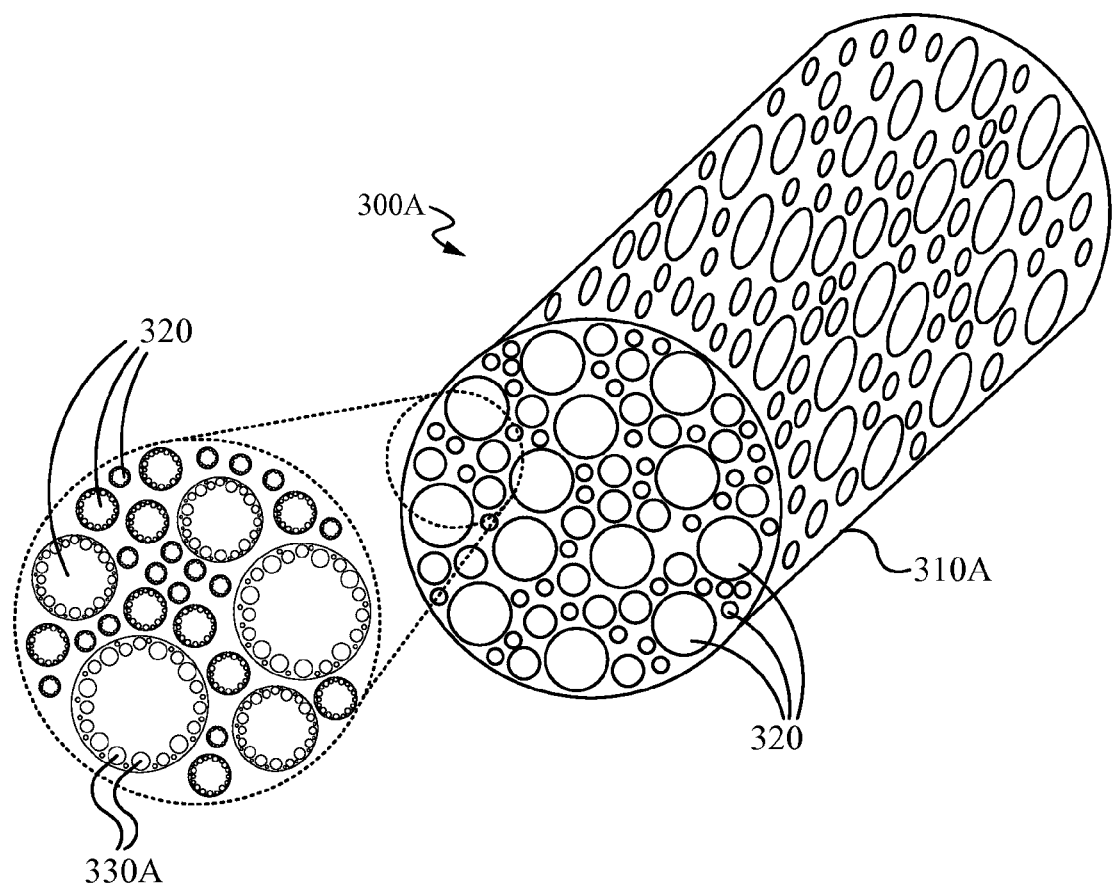
FIG. 3A illustrates a cross-sectional view of one embodiment of a catalyst in accordance with the principles of the present invention.

FIG. 3A illustrates a cross-sectional view of one embodiment of a catalyst 300A in accordance with the principles of the present invention. The catalyst 300A comprises a catalyst support 310A, which is a porous structure, impregnated with catalytic carrier nano-particles 330A, such as the catalytic carrier nano-particles discussed above. As a porous structure, the catalyst support 310A comprises a plurality of pores 320. A close up view of the impregnated porous support 310A is illustrated in FIG. 3A, showing catalytic carrier nano-particles 330A fixed within the pores 320.

Figure 3B:
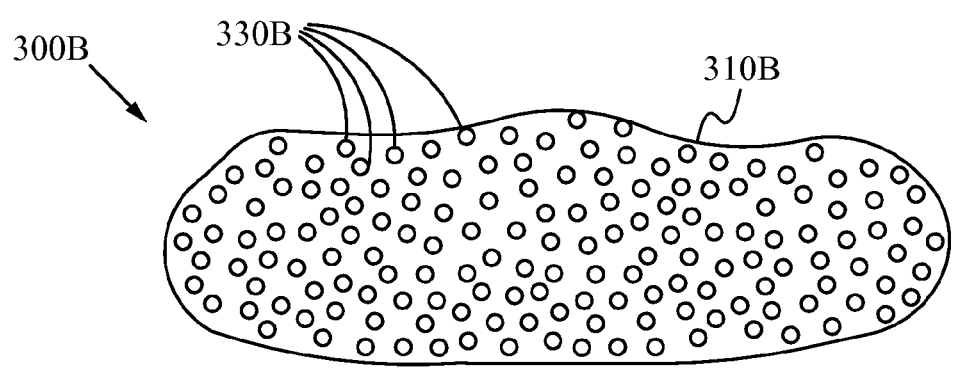
FIG. 3B illustrates a cross-sectional view of another embodiment of a catalyst in accordance with the principles of the present invention.

FIG. 3B illustrates a cross-sectional view of another embodiment of a catalyst 300B in accordance with the principles of the present invention. The catalyst 300B comprises a catalyst support 310B, which is a macro support, impregnated with catalytic carrier nano-particles 330B, such as the catalytic carrier nano-particles discussed above.

It is contemplated that a variety of different methods can be employed to impregnate the catalyst supports 310A, 310B with the catalyst carrier nano particles 330A, 330B. In some embodiments, a liquid dispersion of the catalyst carrier nano-particles is applied to the catalyst support. The catalyst support is allowed to dry and/or a drying process is performed on the catalyst support. As the liquid in the dispersion evaporates, the catalyst carrier nano-particles settle onto the surface of the support and/or into the pores within the support. When the impregnated catalyst support dries, electrostatic interactions and other forces between the catalyst carrier nano-particles and the catalyst support effectuate some adhesion. Advantageously, such forces cause the nano-particles to stick onto the surfaces and pores of the support.

In some embodiments, a calcining step is performed to form oxide-oxide bonds between the nano-particles and the catalyst support, exposing them to heat, pressure, or a combination thereof. The calcining temperature is generally from 350 to 1000 degrees centigrade, and the pressure is on the order of ambient atmosphere to several atmospheres. For optimum oxide-oxide bonds, a portion of the catalytic carrier nano-particles is chosen to correspond to the material of which the catalyst support is comprised. By way of example, if a portion of the catalyst carrier nano-particles comprises alumina, then the catalyst support preferably comprises alumina, although dissimilar oxides are also contemplated. Due to the physical and chemical bond between the catalyst support and the nano-particles, islands of nano-particles that are bonded, fixed or otherwise pinned to the surfaces of the catalyst support will not migrate and coalesce during catalytic conversion. The surface area for catalysis remains high, and therefore the catalytic activity remains high. In effect, operations such as fine chemical plants and oil refineries will not be required to stop operations and swap out ineffective catalyst supports with fresh catalyst supports with the same frequency as existing processes, thereby increasing throughput at the plants and refineries and reducing their overall cost of operation.

Figure 4:
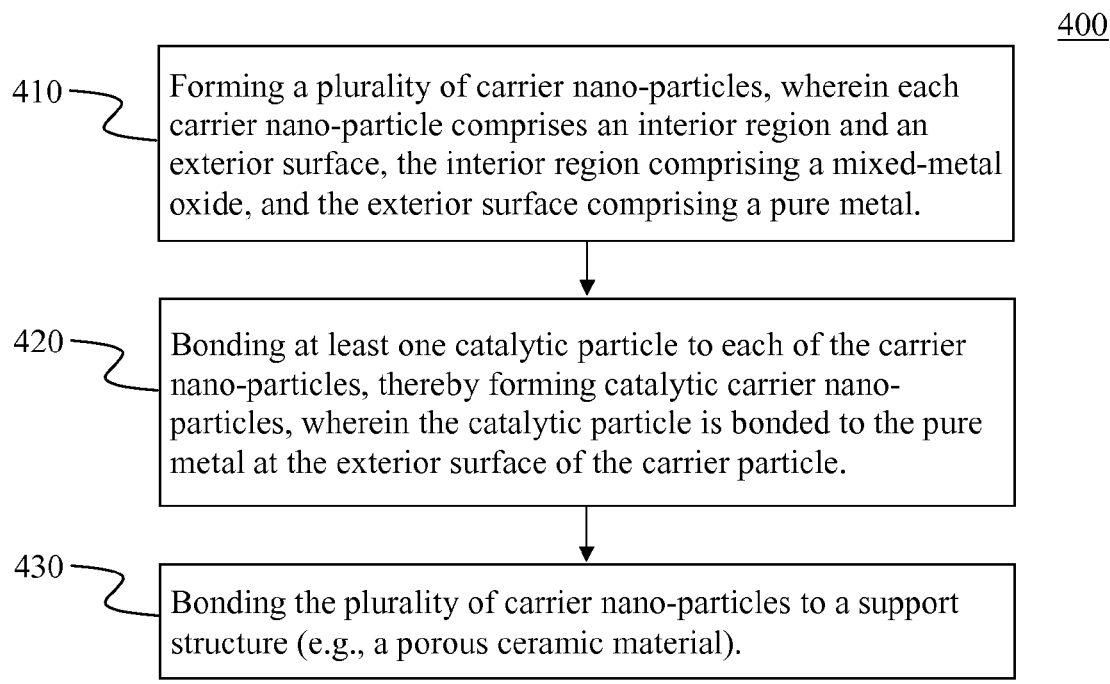
FIG. 4 illustrates one embodiment of a method of producing catalytic carrier nano-particles and a catalyst therefrom in accordance with the principles of the present invention.

FIG. 4 illustrates one embodiment of a method of producing catalytic carrier nano-particles and a catalyst therefrom in accordance with the principles of the present invention.

At step 410, a plurality of carrier nano-particles is formed. Each carrier nano-particle comprises an interior region and an exterior surface. The interior region comprises a mixed-metal oxide, while the exterior surface comprises a pure metal. The carrier nano-particles can comprise any of the elements discussed above with respect to FIGS. 1-2.

At step 420, at least one catalytic particle is bonded to each of the carrier nano-particles, thereby forming catalytic carrier nano-particles. The catalytic particle is bonded to the pure metal at the exterior surface of the carrier particle. The catalytic particle can comprise any of the elements discussed above with respect to FIGS. 1-2.

At step 430, the plurality of carrier nano-particles are bonded to a support structure. One example of such a support structure is a porous ceramic material. However, it is contemplated that other types of support structures can be employed. The support structure can comprise any of the elements discussed above with respect to FIGS. 3A-B.

Figure 5:
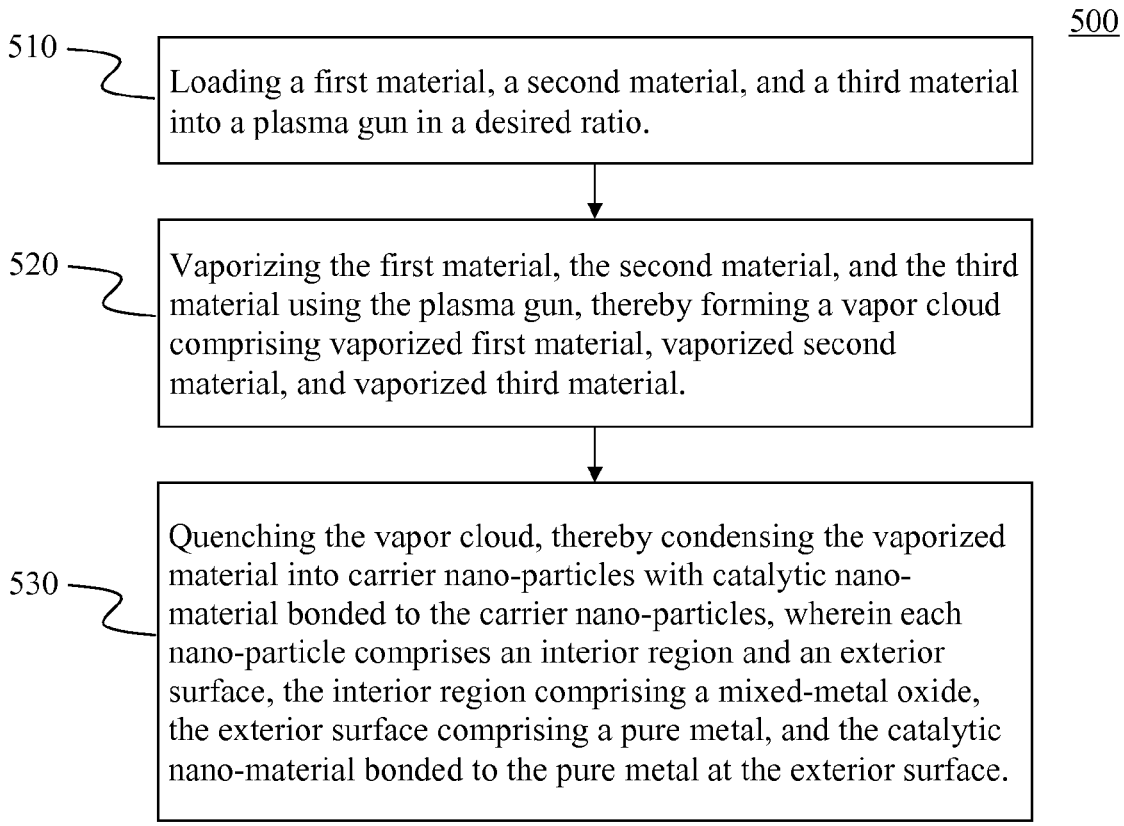
FIG. 5 illustrates one embodiment of a method of producing catalytic carrier nano-particles using a plasma gun in accordance with the principles of the present invention.

FIG. 5 illustrates one embodiment of a method of producing catalytic carrier nano-particles using a plasma gun in accordance with the principles of the present invention.

At step 510, a first material, a second material, and a third material are loaded into a plasma gun in a desired ratio. In some embodiments, the first material is an aluminum oxide material, the second material is a palladium material, and the third material is a platinum material. However, it is contemplated that other materials can be used in addition or as an alternative to these materials.

At step 520, the first material, the second material, and the third material are vaporized using the plasma gun, thereby forming a vapor cloud that comprises vaporized first material, vaporized second material, and vaporized third material.

At step 530, the vapor cloud is quenched, thereby condensing the vaporized material into carrier nano-particles with catalytic nano-material bonded to the carrier nano-particles. Each nano-particle comprises an interior region and an exterior surface. The interior region comprises a mixed-metal oxide. The exterior surface comprises a pure metal. The catalytic nano-material is bonded to the pure metal at the exterior surface.

It is contemplated that the present invention can employ a variety of different types of plasma gun systems to vaporize and quench the loaded material into nano-particles. In a preferred embodiment, the nano-particles are substantially uniform in size. The nano-particles can be formed by introducing micron-sized material into a plasma process, such as described and claimed in the co-owned and co-pending application Ser. No. 11/110,341, filed Apr. 19, 2005, and titled "High Throughput Discovery of Materials Through Vapor Phase Synthesis," and the co-owned and co-pending application Ser. No. 12/151,935, filed May 8, 2008, and titled "Highly Turbulent Quench Chamber," both of which are hereby incorporated by reference as if set forth herein.

Figure 7:
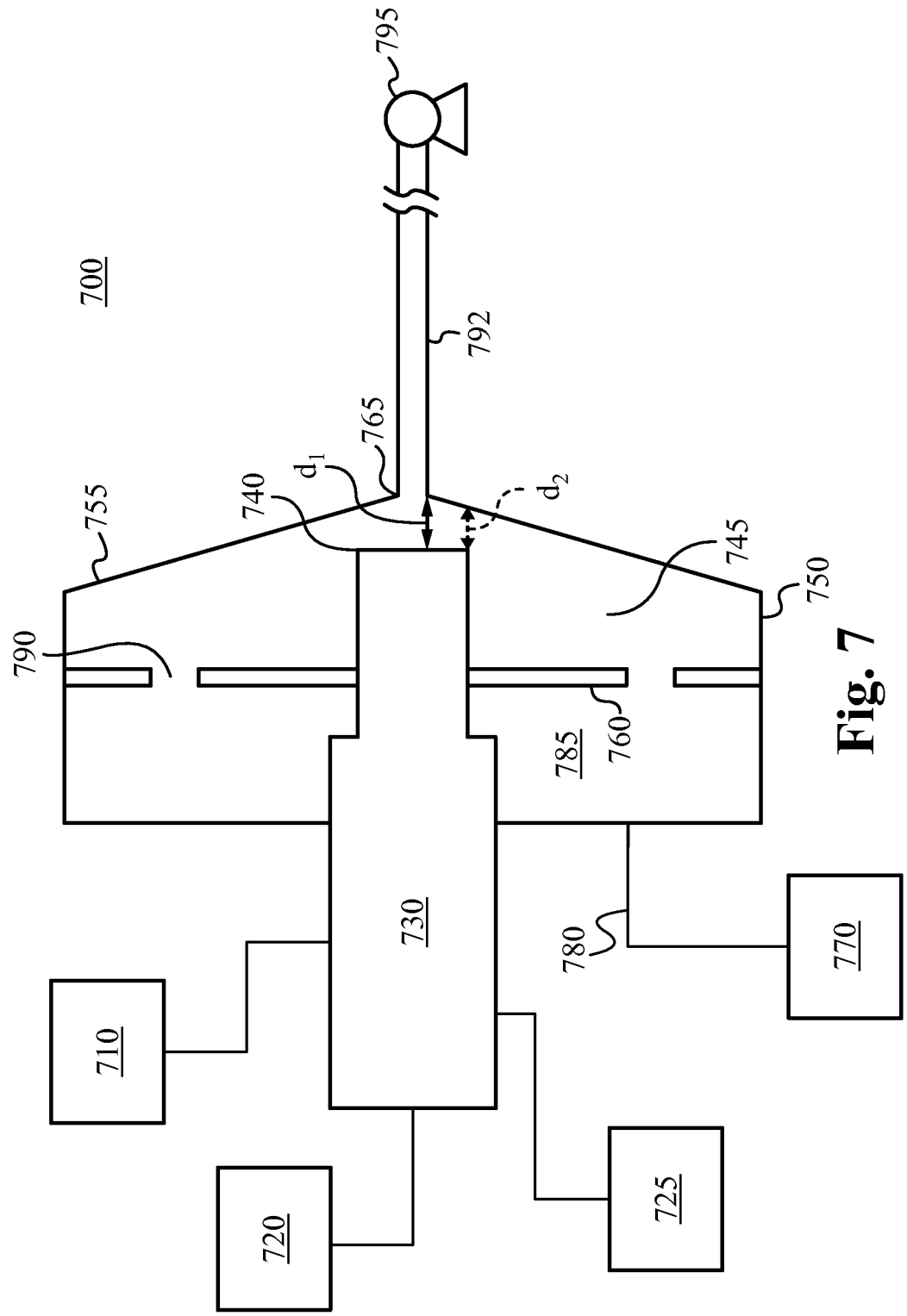
FIG. 7 illustrates one embodiment of a plasma-based particle production system in accordance with the principles of the present invention.

FIG. 7 illustrates one embodiment of a plasma-based particle production system 700 that can be used in accordance with the principles of the present invention. System 700 uses a plasma process and a highly turbulent quench chamber 745 to produce nano-particles. The system 700 comprises a precursor supply device 710 and a working gas supply device 720 fluidly coupled to a plasma production and reaction chamber 730. An energy delivery system 725 is also coupled with the plasma production and reactor chamber 730. The plasma production and reactor chamber 730 includes an injection port 740 that communicates fluidly with the constricting quench chamber 745. One or more ports 790 can also allow fluid communication between the quench chamber 745 and a controlled atmosphere system 770. The quench chamber 745 is also fluidly coupled to an outlet 765.

Generally, the chamber 730 operates as a reactor, producing an output comprising particles within a gas stream. Production includes the basic steps of combination, reaction, and conditioning as described later herein. The system combines precursor material supplied from the precursor supply device 710 and working gas supplied from the working gas supply device 720 within the energy delivery zone of the chamber 730.

In some embodiments, the precursor material comprises a powdered substance. In some embodiments, the precursor material is micron-sized. In some embodiments, the precursor material comprises an average grain diameter of 500-600 nanometers. In some embodiments, the precursor material comprises an average grain diameter of one micrometer. In some embodiments, the precursor material comprises an average grain diameter greater than or equal to 5 microns.

The system energizes the working gas in the chamber 730 using energy from the energy supply system 725, thereby forming a plasma. The plasma is applied to the precursor material within the chamber 730 to form an energized, reactive mixture. This mixture comprises one or more materials in at least one of a plurality of phases, which may include vapor, gas, and plasma. The reactive mixture flows from the plasma production and reactor chamber 730 into the quench chamber 745 through an injection port 740.

The quench chamber 745 preferably comprises a substantially cylindrical surface 750, a frusto-conical surface 755, and an annular surface 760 connecting the injection port 740 with the cylindrical surface 750. The frusto-conical surface 760 narrows to meet the outlet 765. The plasma production and reactor chamber 730 includes an extended portion at the end of which the injection port 740 is disposed. This extended portion shortens the distance between the injection port 740 and the outlet 765, reducing the volume of region in which the reactive mixture and the conditioning fluid will mix, referred to as the quench region. In a preferred embodiment, the injection port 740 is arranged coaxially with the outlet 765. The center of the injection port is positioned a first distance $d_1$ from the outlet 765. The perimeter of the injection port is positioned a second distance $d_2$ from a portion of the frusto-conical surface 755. The injection port 740 and the frusto-conical surface 755 form the aforementioned quench region therebetween. The space between the perimeter of the injection port 740 and the frusto-conical surface 755 forms a gap therebetween that acts as a channel for supplying conditioning fluid into the quench region. The frusto-conical surface 755 acts as a funneling surface, channeling fluid through the gap and into the quench region.

While the reactive mixture flows into the quench chamber 745, the ports 790 supply conditioning fluid into the quench chamber 745. The conditioning fluid then moves along the frusto-conical surface 755, through the gap between the injection port 740 and the frusto-conical surface 755, and into the quench region. In some embodiments, the controlled atmosphere system 770 is configured to control the volume flow rate or mass flow rate of the conditioning fluid supplied to the quench region.

As the reactive mixture moves out of the injection port 740, it expands and mixes with the conditioning fluid. Preferably, the angle at which the conditioning fluid is supplied produces a high degree of turbulence and promotes mixing with the reactive mixture. This turbulence can depend on many parameters. In a preferred embodiment, one or more of these parameters is adjustable to control the level of turbulence. These factors include the flow rates of the conditioning fluid, the temperature of the frusto-conical surface 755, the angle of the frusto-conical surface 755 (which affects the angle at which the conditioning fluid is supplied into the quench region), and the size of the quench region. For example, the relative positioning of the frusto-conical surface 755 and the injection port 740 is adjustable, which can be used to adjust the volume of quench region. These adjustments can be made in a variety of different ways, using a variety of different mechanisms, including, but not limited to, automated means and manual means.

During a brief period immediately after entering the quench chamber 745, particle formation occurs. The degree to which the particles agglomerate depends on the rate of cooling. The cooling rate depends on the turbulence of the flow within the quench region. Preferably, the system is adjusted to form a highly turbulent flow, and to form very dispersed particles. For example, in preferred embodiments, the turbidity of the flow within the quench region is such that the flow has a Reynolds Number of at least 1000.

Still referring to FIG. 7, the structure of the quench chamber 745 is preferably formed of relatively thin walled components capable of dissipating substantial quantities of heat. For example, the thin-walled components can conduct heat from inside the chamber and radiate the heat to the ambient.

Substantial heat is emitted, mostly in the form of radiation, from the reactive mixture following its entry into the quench chamber 745. The quench chamber 745 is designed to dissipate this heat efficiently. The surfaces of the quench chamber 745 are preferably exposed to a cooling system (not shown). In a preferred embodiment, the cooling system is configured to control a temperature of the frusto-conical surface 755.

Following injection into the quench region, cooling, and particle formation, the mixture flows from the quench chamber 745 through the outlet port 765. Suction generated by a generator 795 moves the mixture and conditioning fluid from the quench region into the conduit 792. From the outlet port 765, the mixture flows along the conduit 792, toward the suction generator 795. Preferably, the particles are removed from the mixture by a collection or sampling system (not shown) prior to encountering the suction generator 795.

Still referring to FIG. 7, the controlled atmosphere system 770 is fluidly coupled to a chamber 785, which is fluidly coupled to the quench region through port(s) 790, into which conditioning fluid is introduced from a reservoir of the controlled atmosphere system 770 through a conduit 780. As described above, the conditioning fluid preferably comprises argon. However, other inert, relatively heavy gases are equally preferred. Also, as discussed above, the preferable mechanism of providing the conditioning fluid into the quench chamber 745 is the formation of a pressure differential between the quench chamber 745 and the outlet 765. Such pressure differential will draw the conditioning fluid into the quench chamber 745 through the ports 790. Other methods of providing the conditioning fluid include, but are not limited to, forming positive pressure within the chamber 785.

The angle of the frusto-conical surface affects the angle at which the conditioning fluid is supplied into the quench region, which can affect the level of turbulence in the quench region. The conditioning fluid preferably flows into the quench region along a plurality of momentum vectors. The greater the degree of the angle between the momentum vectors, the higher the level of turbulence that will be produced. In a preferred embodiment, the high turbulent quench chamber comprises a frusto-conical surface that is configured to funnel at least two conditioning fluid momentum vectors into the quench region such that there is at least a 90 degree angle between the two momentum vectors. It is contemplated that other angle degree thresholds may be applied as well. For example, attention may also be paid to the angle formed between at least one of the conditioning fluid momentum vectors and the momentum vector of the reactive mixture. In one embodiment of a highly turbulent quench chamber, a reactive mixture inlet is configured to supply the reactive mixture into the quench region along a first momentum vector, the frusto-conical surface is configured to supply the conditioning fluid to the quench region along a second momentum vector, and the second momentum vector has an oblique angle greater than 20 degrees relative to the first momentum vector.

The size of the quench region also affects the level of turbulence in the quench region. The smaller the quench region, the higher the level of turbulence that will be produced. The size of the quench region can be reduced by reducing the distance between the center of the injection port 740 and the outlet 765.

The high turbulence produced by the embodiments of the present invention decreases the period during which particles formed can agglomerate with one another, thereby producing particles of more uniform size, and in some instances, producing smaller-sized particles. Both of these features lead to particles with increased dispersibility and increased ratio of surface area to volume. While the plasma process described above is extremely advantageous in producing the nano-particles, it is contemplated that the nano-particles can be produced in other ways as well.

Figure 6:
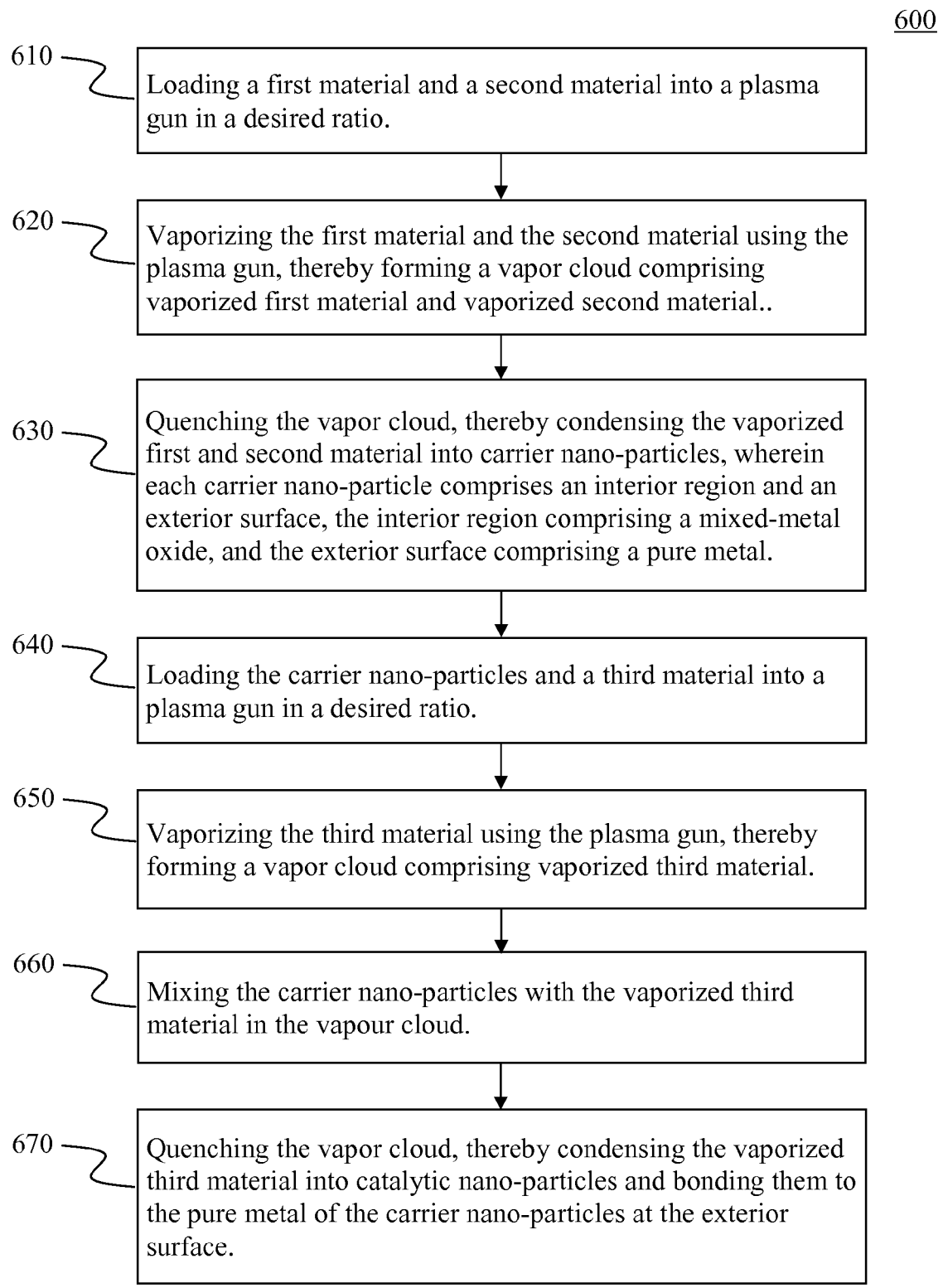
FIG. 6 illustrates another embodiment of a method of producing catalytic carrier nano-particles using a plasma gun in accordance with the principles of the present invention.

FIG. 6 illustrates another embodiment of a method of producing catalytic carrier nano-particles using a plasma gun in accordance with the principles of the present invention.

At step 610, a first material and a second material are loaded into a plasma gun in a desired ratio. In some embodiments, the first material is an aluminum oxide material and the second material is a palladium material. However, it is contemplated that other materials can be used in addition or as an alternative to these materials.

At step 620, the first material and the second material are vaporized using the plasma gun, thereby forming a vapor cloud that comprises vaporized first material and vaporized second material.

At step 630, the vapor cloud is quenched, thereby condensing the vaporized first material and vaporized second material into carrier nano-particles. Each carrier nano-particle comprises an interior region and an exterior surface. The interior region comprises a mixed-metal oxide. The exterior surface comprises a pure metal.

At step 640, the carrier nano-particles and a third material are loaded into a plasma gun in a desired ratio. In some embodiments, the third material is a platinum material. However, it is contemplated that other materials can be used in addition or as an alternative to a platinum material.

At step 650, the third material is vaporized using the plasma gun, thereby forming a vapor cloud that comprises vaporized third material.

At step 660, the carrier nano-particles are mixed with the vaporized third material in the vapor cloud.

At step 670, the vapor cloud is quenched, thereby condensing the vaporized third material into catalytic nano-particles and bonding them to the pure metal at the exterior surface of the carrier nano-particles.

As discussed above, it is contemplated that the present invention can employ a variety of different types of plasma gun systems to vaporize and quench the loaded material into nano-particles. The nano-particles can be formed by introducing micron-sized material into a plasma process, such as described and claimed in the co-owned and co-pending application Ser. No. 12/152,111, filed May 9, 2008, and titled "Powder Coating System and Method Including Gun Extension," which is hereby incorporated by reference as if set forth herein.

Figure 8:
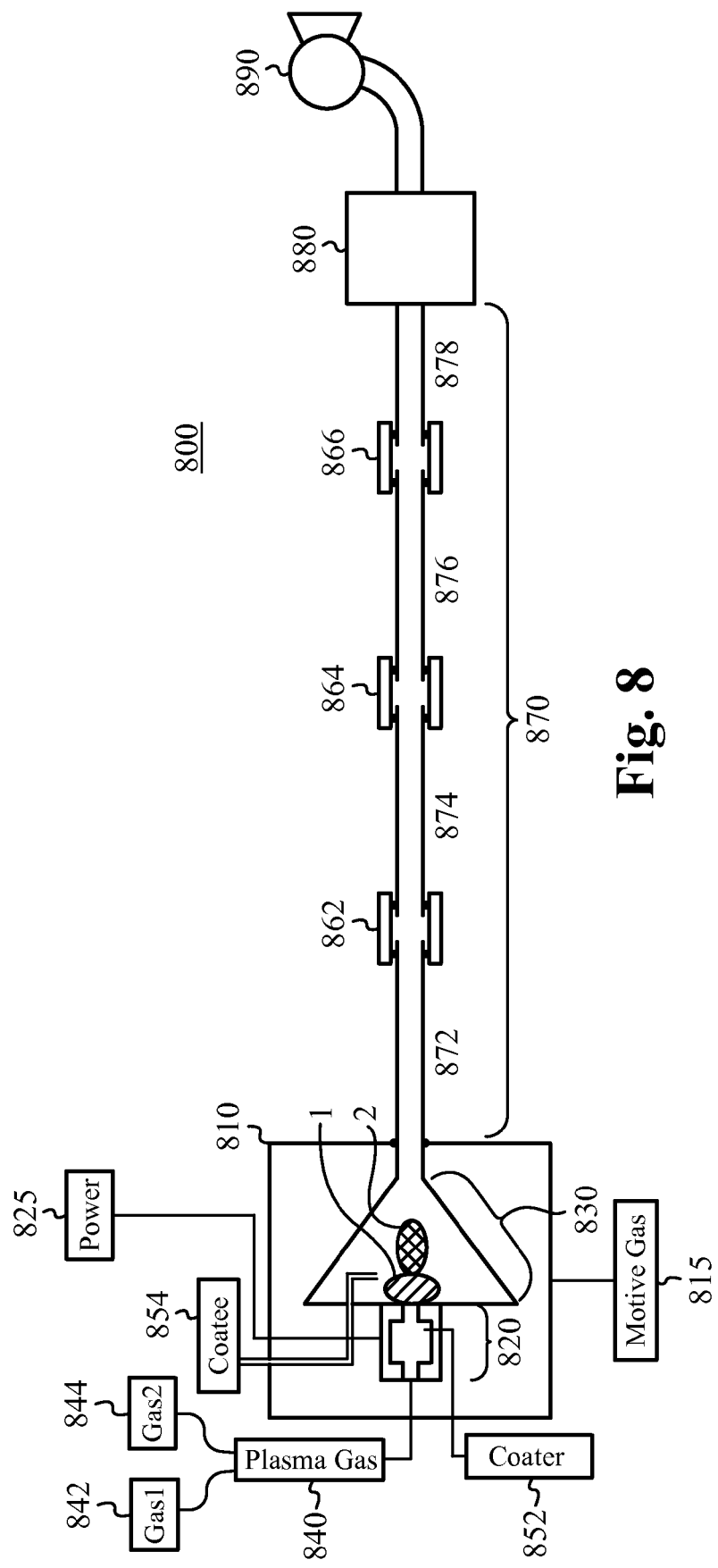
FIG. 8 illustrates another embodiment of a plasma based particle production system in accordance with the principles of the present invention.

FIG. 8 illustrates another embodiment of a plasma based particle production system 800 in accordance with the principles of the present invention. System 800 comprises a plasma production chamber 820, a coating chamber 830, a cooling conduit 870, a sampling system 880, and a motive pump 890. The plasma production chamber 820 and coating chamber 830 are preferably enclosed in a motive gas supply chamber 810.

The motive gas supply chamber 810 is fluidly coupled to a motive gas supply system 815, which is configured to supply a motive gas. Preferably, the motive gas is an inert gas, such as argon. Furthermore, the chamber 810 preferably include airtight inlets and outlets configured to permit conduits to pass through to supply the plasma production chamber 820 and coating chamber 830. The motive gas supply chamber 810 can include airtight couplings that permit these conduits to pass through while preventing leakage either into or out of the chambers. Furthermore, output from the coating chamber 830 can flow into the cooling conduit 870, which can also passes through a wall of the motive gas supply chamber 810. Preferably, the cooling conduit 870 also exits the motive gas supply chamber through an airtight coupling.

The plasma production chamber 820 preferably includes several types of inputs for receiving power, gas, and target materials. Inputs are provided to the chamber 820 by a variety of supply systems through means described below. Functional aspects of these supply systems are also described below.

Various input conduits fluidly couple the plasma gas supply mixer 840 with a first gas supply vessel 842 and a second gas supply vessel 844. The plasma gas supply system 840 includes an outlet fluidly coupled with an inlet of the plasma production chamber 820. The gas supply system 840 and the production chamber 820 are coupled by a conduit that passes through the motive gas supply chamber 810. Preferably, but not shown in the figure, an overall system controller provides control signals to the plasma gas supply system 840.

The power supply system 825 is also coupled to the plasma production chamber 820 through conduits that pass through the motive gas supply chamber 810. Preferably, but not shown in the figure, an overall system controller provides control signals to the power supply system 825.

The coater supply system 852 houses precursor material and includes an externally controllable delivery system fluidly coupled to a materials inlet of the plasma production chamber 820. The supply system 852 is coupled with the production chamber 820 by a conduit that passes through the motive gas supply chamber 810. Preferably, but not shown in the figure, an overall system controller provides control signals to the supply system 852.

Preferably, the conduits that run between the plasma gas supply system 840 and the production chamber 820, the coater supply system 852 and the plasma production chamber 820, and the power supply system 825 and the plasma production chamber 820, all enter the motive gas supply chamber 810 through air-tight seals. In some embodiments, the conduits of the various supply systems all have dedicated airtight entrances to the motive gas supply chamber 810. In some embodiments, a single airtight entrance accommodates multiple conduits.

The coating chamber 830 preferably includes inlets for motive gas, coater material-plasma mixture, and coatee material, as well as an outlet to provide an output to the cooling conduit 870. The inlets for motive gas couple the motive gas supply chamber 810 to the interior of the coating chamber 830. Preferably, these inlets are channels of adjustable size that directly coupled the two chambers, yet permit for controlled flow from the supply chamber 810 into the coating chamber 830.

Coatee material is stored within the coatee material supply system 854, which preferably sits outside the motive gas supply chamber 810. A conduit passes from the supply system 854 through the motive gas supply chamber 810 and also through a wall of the coating chamber 830. The coatee material supply system 854 includes a controllable delivery system that provides coatee material to the conduit. Preferably, the conduit enters both chambers though airtight seals. The conduit terminates within the coating chamber at a selected location. Preferably, the location of the terminus is selected based on parameters of operation. Also preferably, but not shown, an overall system controller is configured to supply control signals to the supply system 854.

The cooling conduit 870 connects the coating chamber 830 with the sampling system 880. The conduit 870 exits the motive gas supply chamber 810 through airtight means. The cooling conduit 870 includes a first section 872, a second section 874, third section 876, and fourth section 878. The sections are joined by gas input couplings that contain gas input features. The first section 872 is joined to the second section 874 by the gas input coupling 862. In turn, the second section 874 is joined to the third section 876 by the gas input coupling 864. The gas input coupling 866 joins the third section 876 to the fourth section 878.

In the illustrated embodiment, no gas is shown being supplied to the gas input couplings 862, 864, 866 for input into the cooling conduit 870. However, gas can be supplied through one or more of the gas input couplings.

The sampling system 880 is fluidly coupled between the cooling conduit 870 and the motive pump 890. The sampling system 880 is configured to receive output from the cooling conduit 870, sample material having appropriate characteristics from the output, and permit remains of the output to flow to the motive pump 890, which is fluidly coupled through a conduit to the sampling system 880.

During operation, the supply systems 840, 852, and 825 provide plasma gas, coater material, and power, respectively, to the plasma production chamber 820. Power from the delivery system 825 is used to energize gas from the supply system 840 to produce a plasma within the production chamber 820. The coater material supply system 852 provides coater material in metered amounts into the plasma production chamber 820, exposing the coater material to plasma formed therein.

The overall control system (not shown) sends signals to the plasma gas supply system 840, coater material supply system 852, and power supply system 825 to set operational parameters. The plasma gas supply system 840 determines the ratio of mixing for the first and second gasses to produce plasma gas, as well as the rate at which the plasma gas feeds into the plasma production chamber 820. In a preferred embodiment, the first gas is hydrogen and the second gas is an inert gas, such as argon. The coater material supply system 852 determines the rate at which the coater material is supplied into the plasma production chamber 820. The power supply system 825 determines the voltage and amperage at which power is supplied to the plasma production chamber. In combination, these parameters determine the characteristics of the plasma produced within the plasma production chamber 820, as well as the characteristics of the plasma-coatee material mixture also produced within the chamber 820. Furthermore, although the coater supply system is described as providing only a single coater material into the plasma production chamber 820 at a single location, in some embodiments of the present invention, the coater supply system 852 supplies a plurality of materials into the plasma production chamber 820 at one or more locations.

The motive gas supply chamber 810 receives motive gas, typically an inert gas such as argon, from a preferably dedicated motive gas supply system 815. The motive gas supply chamber 810 provides an airtight enclosure around the plasma production chamber 820 and coating chamber 830. The motive gas supply system 815 preferably maintains a pressure within the motive gas supply chamber 810 that slightly exceeds the ambient pressure of the environment in which the system 800 is housed, regardless of any variation in suction force generated by the motive pump 890.

The coating chamber 830 receives a coater material and plasma mixture from the plasma production chamber 820. The coating chamber 830 also receives motive gas through input features. Preferably, these input features provide for an adjustable flow rate of motive gas into the coating chamber 830. Motive gas flow is preferably motivated by the motive pump 890 by pulling a negative pressure on the conduit 870, motivating mass flow through the outlet of the coating chamber 870. However, the flow rate of the motive gas into the coating chamber 830 is preferably controlled by the overall control system.

Furthermore, the coatee material supply system 854 provides a metered stream of coater material through the coatee material conduit to the conduit's terminus location within the coating chamber 830. The rate at which coatee material is provided into the chamber 830 preferably is determined by the overall control system. Furthermore, although the terminus of the coatee material supply conduit is shown to deposit material only at one location within the coating chamber 830, in some embodiments of the present invention, the terminus deposits coatee material at a plurality of locations within the conduit (e.g., in an annular configuration surrounding output of the plasma production chamber 820).

Preferably, coating chamber 830 is shaped and the operational parameters of the apparatus 800 are controlled so that the coater material and plasma mixture enters the coating chamber and reaches a maximum enthalpy shortly thereafter. Most preferably, this maximum of enthalpy occurs within a defined region of the coating chamber 830, with the average enthalpy of the mixture falling as it moves away from that region with its minimum (within the coating chamber 830) coming at the outlet to the cooling conduit 870. For example, as illustrated in FIG. 8, the maximum enthalpy occurs in region 1. In these embodiments, the location of the terminus for delivery of the coatee material is chosen to be outside the maximum region and between the maximum region and the outlet.

Furthermore, in certain embodiments of the present invention, the coating chamber 830 is shaped and the operational parameters of the apparatus 800 are chosen so that the coater material begins to condense from the coater material and gas mixture within a defined region of the coating chamber 830. For example, in FIG. 8, the region 2 is such an initial condensation region. Typically, the initial condensation region lies between the maximum enthalpy region and the outlet of the coating chamber 830. In some embodiments, the coatee material is delivered into the initial condensation region. Preferably in these embodiments, sufficient enthalpy remains in the condensing mixture to vaporize the coatee material. Thus, as the coater material is condensing to form particles, the coatee material is vaporized mixed with the condensing particles. As the coater material gas particle mixture mixes with the vaporized coatee material and moves towards the outlet, the coater condenses on the coatee particles, forming a plurality of coated particles.

The cooling conduit 870 receives the coated particle and gas mixture from the coating chamber 830. Preferably, the mixture is pulled into the cooling conduit by the motive pump 890. However, in some embodiments, a motive pump or other system within the sampling system 880 provides some motive force to pull the mixture. Of course, to some extent, pressure provided by the plasma production chamber 820 and the motive gas supply 815 motivate the movement of the mixture into the cooling conduit 870.

In some embodiments, the cooling conduit 870 is equipped with an active cooling system. In some embodiments, a gas is supplied into the gas input couplings 862, 864, or 866. In some of these embodiments, the gas is a cooling and entraining gas. In some of these embodiments, the gas is a passivating gas configured to reduce the reactivity of the condensed particles within the mixture.

As mentioned above, the sampling system 880 preferably permits the motive pump 890 to provide a motive force therethrough. However, in some embodiments the sampling system 880 provides additional motive force. In some embodiments the sampling system 880 supplants the motive force provided by the motive pump 890 and provides a substitute motive force to the cooling conduit 870.

It is contemplated that the sampling system 880 can be configured in a variety of ways. In one embodiment, the sampling system 880 comprises a sampling structure, at least one filled aperture formed in the sampling structure, and at least one unfilled aperture formed in the sampling structure. Each filled aperture is configured to collect particles from the mixture stream, such as by using a filter. The sampling structure is configured to be adjusted between a pass-through configuration and a collection configuration. The pass-through configuration comprises an unfilled aperture being fluidly aligned with a conduit, such as conduit 870, thereby allowing the unfilled aperture to receive the mixture stream from the conduit and the mixture stream to flow through the sampling structure without substantially altering the particle content of the mixture stream. The collection configuration comprises a filled aperture being fluidly aligned with the conduit, thereby allowing the filled aperture to receive the mixture stream and collect particles while the mixture stream is being flown through the filled aperture. It is contemplated that the sampling structure can be adjusted between the pass-through configuration and the collection configuration in a variety of ways. In one embodiment, the sampling structure is a disk-shaped structure including an annular array of apertures, wherein the annular array comprises a plurality of the filled apertures and a plurality of the unfilled apertures. The sampling structure is rotatably mounted to a base, wherein rotational movement of the sampling structure results in the adjustment of the sampling structure between the pass-through configuration and the collection configuration. In another embodiment, the sampling structure is a rectangular-shaped structure including a linear array of apertures, wherein the linear array comprises a plurality of the filled apertures and a plurality of the unfilled apertures. The sampling structure is slideably mounted to a base, wherein sliding of the sampling structure results in the adjustment of the sampling structure between the pass-through configuration and the collection configuration.

It is contemplated that the particles of the present invention can be formed and bonded using wet chemistry methods in addition or as an alternative to the use of a plasma-based system. Such methods include, but are not limited to, the methods described in the following references, which are hereby incorporated by reference as if set forth herein: Adschiri et al., "Hydrothermal synthesis of metal oxide nanoparticles at supercritical conditions" (*Journal of Nanoparticle Research* 3: 227-235, 2001); Kratohvil et al., "Preparation and properties of coated, uniform, inorganic colloidal particles: I. Aluminum (hydrous) oxide on hematite, chromia, and titania" (*Advanced Ceramics Materials* 2:4, 1987); Matijevic, "Monodispersed Metal (Hydrous) Oxides—A Fascinating Field of Colloid Science" (*Acc. Chem. Res.* 14, 22-29, 1981); Lakshmi et al., "Sol-Gel Template Synthesis of Semiconductor Oxide Micro- and Nanostructures" (*Chem. Mater.* 9, 2544-2550, 1997); Carnes et al., "Synthesis, Characterization, and Adsorption Studies of Nanocrystalline Aluminum Oxide and a Biometallic Nanocrystalline Aluminum Oxide/Magnesium Oxide" (*Chem. Mater.* 14, 2922-2929, 2002); Zhu et al., "γ-Alumina Nanofibers Prepared from Aluminum Hydrate with Poly (ethylene oxide) Surfactant" (*Chem. Mater.* 14, 2086-2093, 2002); Alexander et al., "PROCESS FOR MODIFYING THE PROPERTIES OF A SILICA SOL AND PRODUCT THEREOF" (U.S. Pat. No. 2,892,797, Issued Jun. 30, 1959); Alexander et al., "AQUASOLS OF POSITIVELY-CHARGED COATED SILICA PARTICLES AND THEIR PRODUCTION" (U.S. Pat. No. 3,007,878, Issued Nov. 7, 1961); Moore, Jr., "STABLE POSITIVELY CHARGED ALUMINA COATED SILICA SOLS AND THEIR PREPARATION BY POST-NEUTRALIZATION" (U.S. Pat. No. 3,719,607, Issued Mar. 6, 1973); Moore, Jr., "STABLE POSITIVELY CHARGED ALUMINA COATED SILICA SOLS" (U.S. Pat. No. 3,745,126, Issued Jul. 10, 1973); and Kovarik, "METAL OXIDE SOLS" (U.S. Pat. No. 3,864,142, Issued Feb. 4, 1975).

Figure 9:
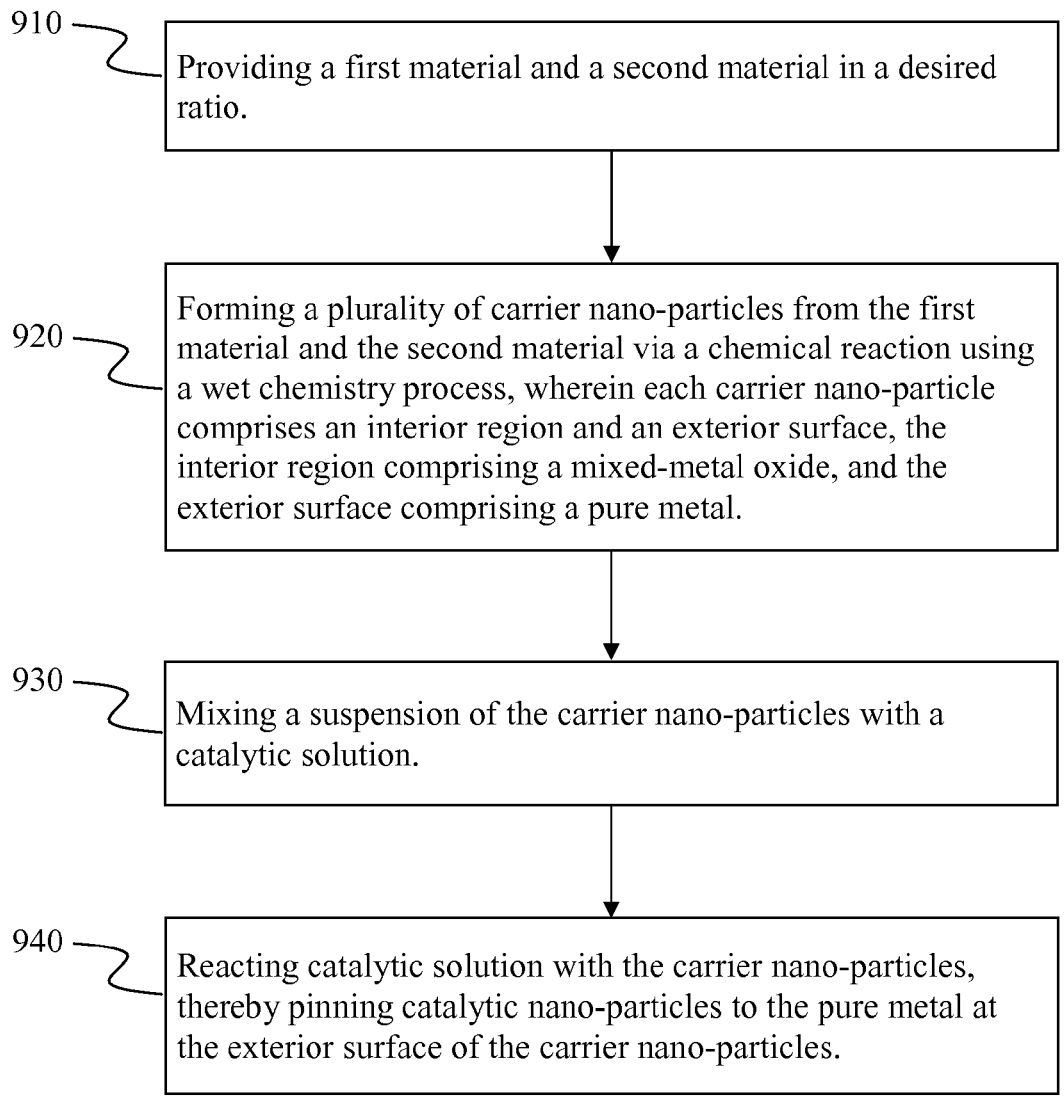
FIG. 9 illustrates one embodiment of a method of catalytic carrier nano-particles using a wet chemistry process in accordance with the principles of the present invention.

FIG. 9 illustrates one embodiment of a method 900 of catalytic carrier nano-particles using a wet chemistry process in accordance with the principles of the present invention.

At step 910, a first material and a second material are provided in a desired ratio. In some embodiments, the first material is an aluminum material and the second material is a palladium material. In some embodiments, the aluminum material is a salt or an organic compound, and the palladium material is a salt. However, it is contemplated that other materials can be used in addition or as an alternative to these materials.

At step 920, a plurality of carrier nano-particles are formed from the first material and the second material via a chemical reaction using a wet chemistry process. Each carrier nano-particle comprises an interior region and an exterior surface, the interior region comprises a mixed-metal oxide. The exterior surface comprises a pure metal. In some embodiments, the center core of each carrier nano-particle comprises silica.

At step 930, a suspension of the carrier nano-particles is formed and mixed with a catalytic solution (a solution comprising particles having catalytic properties). In some embodiments, the catalytic solution is a platinum solution. In some embodiments, the platinum solution is a platinum nitrate solution or a platinum chloride solution. However, it is contemplated that other types of catalytic solutions can be used.

At step 940, the catalytic solution reacts with the carrier nano-particles, thereby pinning catalytic nano-particles to the pure metal at the exterior surface of the carrier nano-particles. For example, in one embodiment, platinum ions from the catalytic solution react with the oxide surface of the carrier nano-particles, resulting in discreet platinum atoms ending up on the surface of the carrier nano-particles. These atoms can diffuse over the oxide surface and agglomerate with other platinum atoms to form platinum nano-particles. When a platinum nano-particle reaches a palladium atom cluster bonded in the oxide surface, the platinum cluster alloys with the palladium cluster, thereby pinning the platinum cluster. In some embodiments, the carrier nano-particles have an average grain size of approximately 10 nanometers or less. In some embodiments, the catalytic nano-particles have an average grain size of approximately 1 nanometer or less. In some embodiments, the catalytic nano-particles have an average grain size of approximately ½ nanometer. However, it is contemplated that other sizes are within the scope of the present invention.

Figure 10:
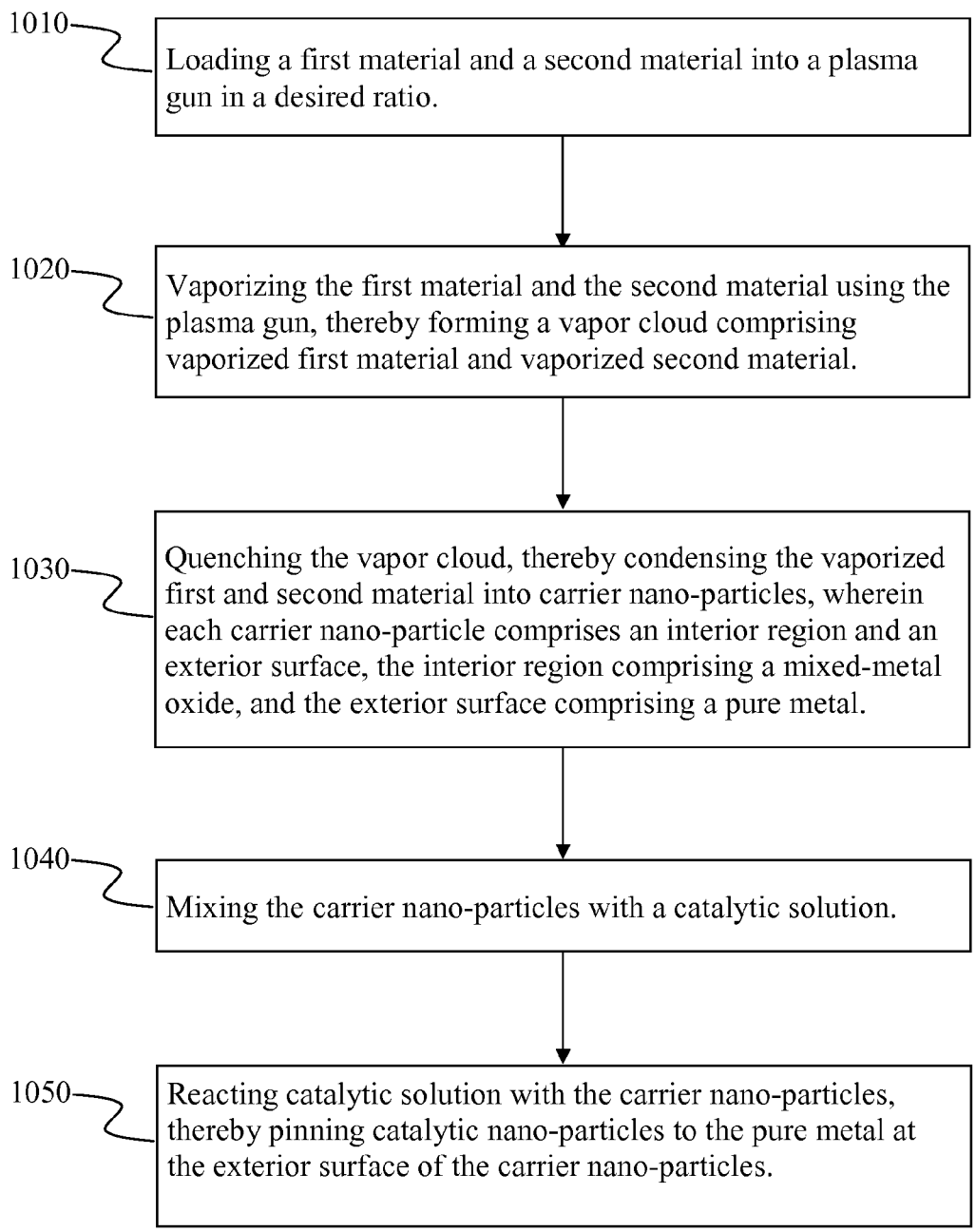
FIG. 10 illustrates one embodiment of a method of producing catalytic carrier nano-particles using both a plasma gun and a wet chemistry process in accordance with the principles of the present invention.

FIG. 10 illustrates one embodiment of a method 1000 of producing catalytic carrier nano-particles using both a plasma gun and a wet chemistry process in accordance with the principles of the present invention.

At step 1010, a first material and a second material are loaded into a plasma gun in a desired ratio. In some embodiments, the first material is an aluminum oxide material and the second material is a palladium material. However, it is contemplated that other materials can be used in addition or as an alternative to these materials.

At step 1020, the first material and the second material are vaporized using the plasma gun, thereby forming a vapor cloud that comprises vaporized first material and vaporized second material.

At step 1030, the vapor cloud is quenched, thereby condensing the vaporized first material and vaporized second material into carrier nano-particles. Each carrier nano-particle comprises an interior region and an exterior surface. The interior region comprises a mixed-metal oxide. The exterior surface comprises a pure metal. One objective of the present invention is to mix an easily oxidizable and reducible metal into a carrier oxide (e.g., aluminum oxide, ceria, zirconia, silica, etc.). The idea is that the metal (e.g., Pd, Cu, Zn, Cr, Ni, etc.) gets incorporated into the oxide matrix. However, by making this an oxygen deficient environment, such as by adding $H_2$ into the carrier gas, some of the metal is in its non-oxidized state on the surface of the particle. One method that can be used is to form mixed-metal oxide nano-particles, and then expose them to a reducing environment, such as $H_2$ at temperature or a $H_2$ plasma, and partially reduce the metal-oxide on the surface. The carrier-oxide would not easily reduce in this environment. However, the oxidation state of the metal buried below the surface of the mixed metal oxide is not crucial. The result is a mixed-metal oxide particle with metal atoms on the surface that are not fully oxidized. These metal atoms form the anchor for the metallic catalysis particles added later, such as described in steps 930 and 940 of FIG. 9 and steps 1040 and 1050 of FIG. 10.

At step 1040, the carrier nano-particles are mixed with a catalytic solution. In some embodiments, the catalytic solution is a platinum solution. In some embodiments, the platinum solution is a platinum nitrate solution or a platinum chloride solution. However, it is contemplated that other types of catalytic solutions can be used.

At step 1050, the catalytic solution reacts with the carrier nano-particles, thereby pinning catalytic nano-particles to the pure metal at the exterior surface of the carrier nano-particles. For example, in one embodiment, platinum ions from the catalytic solution react with the oxide surface of the carrier nano-particles, resulting in discreet platinum atoms ending up on the surface of the carrier nano-particles. These atoms can diffuse over the oxide surface and agglomerate with other platinum atoms to form platinum nano-particles. When a platinum nano-particle reaches a palladium atom cluster bonded in the oxide surface, the platinum cluster alloys with the palladium cluster, thereby pinning the platinum cluster. In some embodiments, the carrier nano-particles have an average grain size of approximately 10 nanometers or less. In some embodiments, the catalytic nano-particles have an average grain size of approximately 1 nanometer or less. In some embodiments, the catalytic nano-particles have an average grain size of approximately ½ nanometer. However, it is contemplated that other sizes are within the scope of the present invention.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of forming nano-particles, the method comprising:
   forming a plurality of aluminum-palladium carrier nano-particles using a plasma gun, wherein the aluminum-palladium carrier nano-particles comprise an interior region and an exterior surface, the interior region comprising a mixed-metal oxide that includes aluminum oxide and palladium, and the exterior surface comprising pure metallic palladium; and
   affixing platinum nano-particles to the pure metallic palladium on the aluminum-palladium carrier nano-particles using a wet chemistry process;
   wherein forming the plurality of aluminum-palladium carrier nano-particles using the plasma gun comprises:
   loading a quantity of aluminum oxide material and a quantity of palladium material into the plasma gun in a desired ratio, wherein the aluminum oxide material and the palladium material are in powder form;

vaporizing the quantity of aluminum oxide material and the quantity of palladium material using the plasma gun, thereby forming a vapor cloud comprising vaporized aluminum oxide and vaporized palladium; and quenching the vapor cloud, thereby condensing the vaporized aluminum oxide and the vaporized palladium into carrier nano-particles.

2. The method of claim 1, wherein the step of vaporizing the quantity of aluminum oxide material and the quantity of palladium material comprises:

flowing a working gas into a reactor of the plasma gun;

delivering energy to the working gas, thereby forming a plasma stream; and flowing the quantity of aluminum oxide material and the quantity of palladium material into the plasma stream.

3. The method of claim 2, wherein the working gas comprises argon and $H_2$.

4. The method of claim 2, wherein the palladium in the interior region extends to and is bonded with the pure metallic palladium at the exterior surface.

5. The method of claim 1, wherein the palladium in the interior region extends to and is bonded with the pure metallic palladium at the exterior surface.

6. The method of claim 1, wherein the aluminum-palladium carrier nano-particles have an average grain size of 10 nanometers or less.

7. The method of claim 1, wherein the platinum nano-particles have a diameter of 1 nanometer or less.

8. The method of claim 1, wherein the platinum nano-particles have a diameter of approximately 0.5 nanometer.

9. The method of claim 1, wherein the mixed-metal oxide forms a center core of the aluminum-palladium carrier nano-particles.

10. The method of claim 9, wherein the mixed-metal oxide consists only of aluminum oxide and palladium.

11. The method of claim 1, wherein the wet chemistry process comprises:

mixing a platinum solution with the aluminum-palladium carrier nano-particles; and bonding platinum nano-particles formed from the platinum solution to the pure metallic palladium on the aluminum-palladium carrier nano-particles.

12. The method of claim 11, wherein the platinum solution is a platinum nitrate solution or a platinum chloride solution.

13. A method of forming a catalyst, the method comprising:

providing a support structure;

forming a plurality of aluminum-palladium nano-particles using a plasma gun; and bonding the plurality of nano-particles to the support structure;

wherein forming the plurality of aluminum-palladium carrier nano-particles using the plasma gun comprises:

loading a quantity of aluminum oxide material and a quantity of palladium material into the plasma gun in a desired ratio, wherein the aluminum oxide material and the palladium material are in powder form;

vaporizing the quantity of aluminum oxide material and the quantity of palladium material using the plasma gun, thereby forming a vapor cloud comprising vaporized aluminum oxide and vaporized palladium; and quenching the vapor cloud, thereby condensing the vaporized aluminum oxide and the vaporized palladium into carrier nano-particles.

14. The method of claim 13, wherein:

the support structure is a porous ceramic material; and the nano-particles are disposed within the pores of the ceramic material.

15. The method of claim 13, wherein the aluminum-palladium carrier nano-particles have an average grain size of 10 nanometers or less.

16. The method of claim 13, wherein the platinum nano-particles have a diameter of 1 nanometer or less.

17. The method of claim 13, wherein the platinum nano-particles have a diameter of approximately 0.5 nanometer.

* * * * *